US005101359A

United States Patent [19]

Gross

[11] Patent Number: 5,101,359

[45] Date of Patent: Mar. 31, 1992

[54] SYSTEM FOR AUTOMATIC DISCHARGE OF ARTICLES

[75] Inventor: Barry M. Gross, Exton, Pa.

[73] Assignee: Moore Push-Pin Company, Wyndmoor, Pa.

[21] Appl. No.: 467,732

[22] Filed: Jan. 19, 1990

[51] Int. Cl.[5] .............................................. G06F 15/20

[52] U.S. Cl. ........................................ 364/479; 221/9; 221/129

[58] Field of Search ................ 364/478, 479, 131-134; 221/2, 7, 13, 6, 9, 123, 124, 129; 53/498-501; 377/6, 8, 10, 11, 28, 29; 194/217

[56] References Cited

U.S. PATENT DOCUMENTS

| | | | |
|---|---|---|---|
| 2,965,294 | 12/1960 | Urry | 377/11 X |
| 3,618,819 | 11/1971 | Blackburn | 221/2 |
| 3,633,732 | 1/1972 | Russell | 53/500 |
| 3,677,437 | 7/1972 | Haigler | 221/7 |
| 3,730,386 | 5/1973 | Monsees | 221/7 |
| 3,746,211 | 7/1973 | Burgess | 221/7 |
| 3,823,844 | 7/1974 | Linkemer | 221/13 |
| 3,837,139 | 9/1974 | Roseberg | 221/7 X |
| 4,018,358 | 4/1977 | Johnson | 221/7 |
| 4,096,424 | 6/1978 | Hysler | 250/223 R |
| 4,163,507 | 8/1979 | Bell | 221/2 |
| 4,180,153 | 12/1979 | Krishnan | 198/460 X |
| 4,298,118 | 11/1981 | Cottrell | 198/382 |
| 4,307,390 | 12/1981 | Steffen | 340/684 |
| 4,520,447 | 5/1985 | Nara | 364/478 |
| 4,542,808 | 9/1985 | Lloyd, Jr. et al. | 221/2 X |
| 4,555,624 | 11/1985 | Steffen | 250/223 R |
| 4,680,464 | 7/1987 | Bross | 250/223 R |
| 4,872,541 | 10/1989 | Hayashi | 364/479 X |
| 4,980,292 | 12/1990 | Elbert et al. | 221/7 X |

*Primary Examiner*—Joseph Ruggiero
*Attorney, Agent, or Firm*—William H. Eilberg

[57] ABSTRACT

An automatic discharge system permits the counting and discharge of measured quantities of similar articles. The system includes a set of substantially identical discharge modules arranged in a series. Each discharge module is connected to a counting device which counts a measured quantity of articles and discharges the articles into a container, upon command. Each discharge module also includes a microprocessor, the microprocessors of the discharge modules being identically programmed. Each microprocessor receives inputs from the microprocessors in adjacent modules, anad transmits signals to the adjacent microprocessors, such that signals propagate up and down the series. A central control unit issues a "step" signal which propagates up the series. Each time a microprocessor receives such a "step" signal, it records a "turn". Each microprocessor is programmed to cause its associated counter to dump articles on one or more predetermined "turns". The control unit also receives signals from the last module in the series, and is programmed not to issue another "step" signal until it has received confirmation that all modules in the series are ready for the next "turn". The control unit can be actuated manually, such as by a foot pedal, or automatically, such as by an automatic bagging maachine. In another embodiment, the first discharge module and control unit are combined into one module. In still another embodiment, the modules discharge articles on a "when ready" basis, and they do so only one at a time.

23 Claims, 22 Drawing Sheets

SYSTEM FOR AUTOMATIC DISCHARGE OF ARTICLES

BACKGROUND OF THE INVENTION

The present invention relates to the field of packaging of measured quantities of similar articles, especially small articles such as push-pins, nails, etc. In particular, the invention provides an apparatus for automatic discharge of such articles into containers.

Small articles such as push-pins, and the like, are packaged and sold in measured quantities. It is known to use an electronic counting device which counts the articles as they are fed from a hopper. The counter opens a gate to allow a batch of articles to fall into a container. Examples of such counters are given in U.S. Pat. Nos. 3,618,819, 4,180,153, 3,730,386, and 3,823,844, and in U.S. patent application Ser. No. 07/322,715, filed Mar. 13, 1989 U.S. Pat. No. 4,982,412, entitled. "Apparatus and Method for Counting a Plurality of Similar Articles". The above-cited items are incorporated by reference herein.

It is often necessary to package measured amounts of different articles in the same container. For example, one might need to provide a filled with 100 nails and 100 tacks. In this case, two count-container ers are used, one for the nails and one for the tacks. Each counter must be programmed to dump its articles, and the dumping of both counters should be coordinated so that each package has the required number of nails and tacks.

It has been known to increase the rate at which articles are processed by providing a plurality of counters, and distributing the articles to be discharged among the several counters. However, for each counter, the time to dump a batch of articles is fixed, and reducing the number of articles processed by each counter effectively increases the fraction of time spent by each counter in dumping the articles. Thus, it turns out that the effective feed rate obtained with n counters is less than n times the rate that would be obtained with a single counter.

A preferred means of using multiple counters is to arrange for each counter to count a full complement of articles, and to program the counters to discharge the articles in an alternating manner. With this method, each counter spends the same percentage of its time dumping articles as would be spent by a single-counter system, and the single-system feed rate can be multiplied by the number of counters to obtain the new feed rate. The result is that the system counts and discharges the same number of parts in much less time.

Programming the counters to alternate in discharging articles is not as simple as it would seem. Even a set of identical counters will not take the same time to count the same number of articles, and each counter will not, in general, require the same counting time from one batch of articles to the next. An efficient system must take these variations into account. The counting and dumping devices of the prior art have not solved the problem of coordinating the operations of a series of counters, to function in the manner described above.

The present invention solves the above-described problems. The invention includes an automated system for discharge of articles, the system allowing the efficient use of a plurality of counters. The system allows all the counters to operate in an alternating manner, or simultaneously, or using a combination of alternating and simultaneous actions. The system uses a data transmission method which is simple and rapid. The system can be used to discharge many different types of articles, and can be used with a wide variety of electronic counters.

SUMMARY OF THE INVENTION

The present invention includes a plurality of discharge modules, arranged in a series, each module including an identically-programmed computer. In a first embodiment, the first discharge module is connected to a central control unit which also contains a computer, programmed differently from those in the discharge modules. Each module in the series is connected to operate a counting device which can discharge (or "dump") a measured quantity of articles. The control unit can be actuated manually, by a foot pedal, or automatically, such as by an automatic bagging machine.

Each discharge module has three inputs and three outputs. Except for the first and last discharge modules, each input is connected to an output of an adjacent module, and each output is connected to an input of an adjacent module. Inputs to, and outputs from, the first module in the series are connected to the central control unit. The central control unit may transmit outputs to, and receive inputs from, an external machine, such as a bagging machine. The last discharge module in the series is connected to only one other discharge module.

Due to the connections among the modules, a signal originating at the central control unit propagates "upward", from one module to the next in the series. Similarly, signals originating from the last module in the series propagate "downward" through each module, towards the control unit.

The central control unit repeatedly issues signals which advance each module through a "step". Each discharge module is preset to discharge articles on predetermined steps (for example, every third step, or every fourth step). Depending on the setting of the individual modules, articles can be discharged alternately by the various counters, or the counters can discharge articles simultaneously. Also, various combinations of alternate and simultaneous dumping are possible.

The central control unit can itself be controlled by an external machine, such as an automatic bagging machine. The bagging machine places bags under the chutes of the counters, and issues a signal to the central control unit, calling for the articles to be dumped into the bags. The invention is not limited to use with bagging machines.

The invention can operate in a "manual" or "automatic" mode. In the manual mode, none of the discharge modules will cause their associated counters to dump their articles until all of the modules in the series are ready. In the automatic mode, the discharge modules can initiate dumping without regard to the status of the other modules. Since the time required for each counter to accumulate the desired quantity of articles varies considerably from one counting operation to the next, the automatic mode provides flexibility to the system, and significantly increases its speed.

In another embodiment, the programming of the central control unit and of the discharge module is combined into one program. Thus, in this embodiment, all modules are identically programmed. The operation of the system in this embodiment is the same as in the first embodiment.

In still another embodiment, the modules are programmed to dump articles on a "when ready" basis. In this embodiment, the modules can dump only one at a time, and the order in which the modules dump their articles is altered according to which module is, in fact, ready to dump. This embodiment, which is suitable in applications where all the modules are dumping the same kind of articles, substantially speeds the operation of the system, as the system need not wait for a particular module to become ready for dumping.

It is therefore an object of the invention to provide an automated system for discharging measured quantities of articles.

It is another object to improve the efficiency with which a plurality of similar articles can be delivered to a container.

It is another object to provide a discharge system which can dump articles alternately, using a plurality of staggered units, or simultaneously, using a plurality of units together, or with any combination of alternate and simultaneous dumping.

It is another object to provide an automated discharge system which is sufficiently flexible to take into account the variations encountered in the counting and discharging of articles.

It is another object to provide an automated discharge system which can be used in conjunction with a wide variety of machines, such as automatic bagging machines and automatic blister packaging machines.

It is another object to provide a system as described above, wherein the system comprises a plurality of identically-programmed modules.

It is another object to provide a system as described above, wherein the modules are programmed to dump articles on a "when ready" basis, and wherein only one module can dump at one time.

Other objects and advantages of the invention will be apparent to those skilled in the art, from a reading of the following brief description of the drawings, the detailed description of the invention, and the appended claims.

DETAILED DESCRIPTION OF THE INVENTION

The present invention is an automated system for discharge of articles. The invention includes a plurality of discharge modules, arranged in a series, each module including a programmed computer. The computers in each of the discharge modules are identically programmed. In one embodiment, a central control unit is connected to the first discharge module in the series, and also contains a computer, programmed differently from the computers in the discharge modules. The central control unit can be actuated by a foot pedal, or by an automatic means, such as an automatic bagging or blister-packaging machine.

As used in this specification, the terms "discharge" and "dumping" have identical meanings, and refer to the discharge or release of a counted quantity of similar articles by a counting device. Also, when it is said that a "module" is programmed, it is understood that what is meant is that the computer, or equivalent, within the module, contains the program. Similarly, when it is said that a module "dumps", it is understood that what is meant is that the discharge module causes its associated counter to dump its articles.

Figure 1:
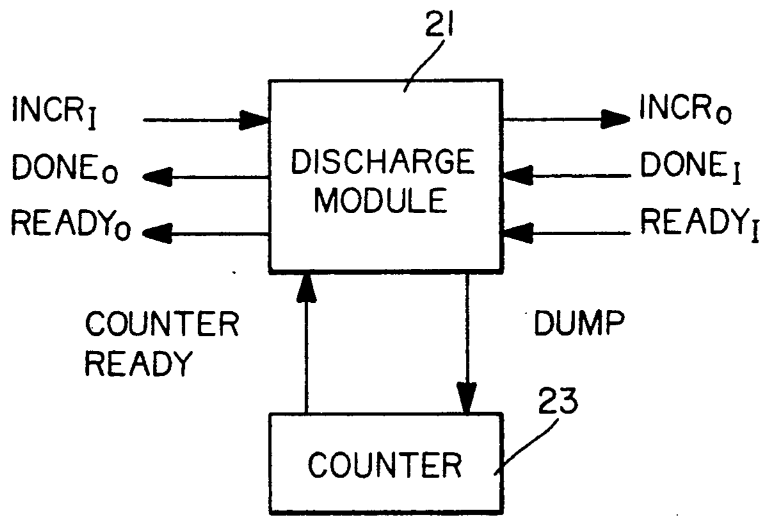
FIG. 1 is a block diagram illustrating the inputs and outputs for a particular discharge module of the present invention, and its associated counter.
Figure 2:
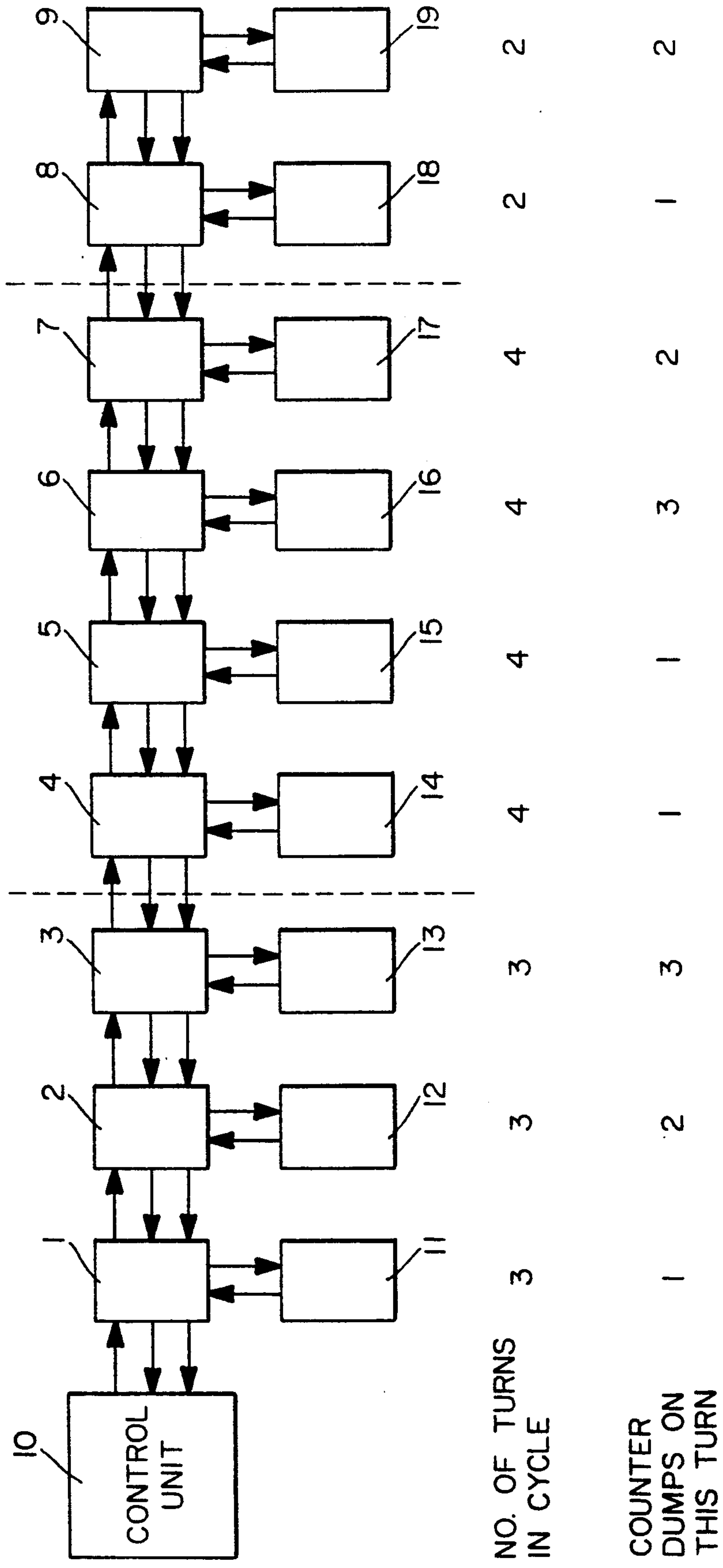
FIG. 2 is a block diagram illustrating a typical series of discharge modules and counters, arranged according to the present invention.

FIGS. 1 and 2 illustrate the fundamentals of operation of the present invention. A plurality of dumping modules are arranged in a series. The electronic circuitry "sees" the system as a series, though the actual physical arrangement of modules could be very different. The present invention is concerned only with the electrical connections, and therefore the set of discharge modules will generally be described as a series, throughout this specification.

The series shown in FIG. 2 has discharge modules, labeled by reference numerals 1–9. Module 1 is the "first" module and module 9 is the "last" module, in the example shown. Thus, with these conventions of "first" and "last", it is meaningful to speak of a "succeeding" and "preceding" module, or of a module which is "higher" (i.e. located nearer to the last module) or "lower" in the series. Also, this specification will use the terms "upward" and "downward" to indicate propagation of signals from the first to the last module, and from the last to the first module, respectively.

Except for the first and last modules, each module receives one input from the preceding module and two inputs from the succeeding module, and can transmit one output to the succeeding module and two outputs to the preceding module. The outputs from a given module become inputs to an adjacent module. The inputs and outputs are illustrated symbolically by arrows, in FIG. 2.

Module 9, the "last" module in this example, does not have a succeeding module. A switch setting on module 9 indicates that this module is the last in the series, and the programming of the modules takes into account the position of the last module. Similarly, the predecessor module to module 1 is not another module, but is instead a central control unit 10. The programming of the central control unit will be described later.

Modules 1–9 are connected, respectively, to counting devices 11–19. Each module sends one output to its counting device, and receives one input from that counting device. The counting devices can be constructed according to the teachings of any of the references cited above. The invention can also be practiced with other counting devices, and it is understood that the invention is not limited to use with a particular type of counter. The only requirement is that the counter be capable of transmitting and receiving output and input signals which are compatible with the programming of the discharge modules.

Although the details of the programming of the modules and the control unit will be described below, it is helpful to provide first a very general explanation of the operation of the first embodiment of the present system.

The central control unit continuously issues signals, to the first discharge module, the signals being propagated "upward" through the series, from one module to the next. Each signal increments a "step" in the program of the module, and each module is programmed to cause its counter to dump articles on a predetermined step. Each discharge module generates signals indicating the status of the dumping operation, and such signals propagate "downward" through the series.

Each discharge module is programmed to recognize a "cycle" which includes a predetermined number of steps. Each module is also programmed to cause its counter to dump on a particular step of the cycle. For example, a module could be programmed to recognize three steps per cycle, and to dump on, say, the second step of each cycle.

It is important to note, however, that the central control unit is not concerned with the number of steps in a cycle. On the contrary, the central control unit simply issues step signals, and does not keep account of their number. The cycles are defined by the settings of the computers in the various discharge modules.

It therefore follows that different subsets of modules in the series can operate with cycles of different lengths. FIG. 2 gives an example of a series having such subsets. In FIG. 2, the dotted lines separate groups of discharge modules and counters, but are otherwise imaginary. The grouping of modules is for convenience of illustration only, and has no significance to the programming of the modules or of the central control unit.

In the example of FIG. 2, the modules are conceived in three groups, namely modules 1-3, modules 4-7, and modules 8-9. The figure shows the number of steps (or "turns") in each cycle, and the "turn" on which each counter dumps. Thus, for modules 1-3, there are three turns in each cycle, and module 1 dumps on the first turn, module 2 dumps on the second turn, and module 3 dumps on the third turn.

For modules 4-7, there are four turns per cycle, and modules 4 and 5 dump on the first turn, module 6 dumps on the third turn, and module 7 dumps on the second turn. Note that no module in this group dumps on the fourth turn. Note also that there is no requirement that the number of turns in a cycle be equal to the number of modules in a group. In the group including modules 4-7, there could have been five turns per cycle, and there then would be two turns (number 4 and 5) in which no module is dumping.

For modules 8 and 9, there are two turns per cycle, and the modules dump alternately, as shown.

The dumping by a module in a particular group proceeds independently of the modules in its group and in the other groups, and is determined solely by the programming to be described below. The only exception to this general rule is that when the system is in "manual" mode (to be described later), no module can dump until all the modules are ready to dump.

Of course, the number of modules in the series is not limited by the example shown. Many alternative arrangements and groupings are possible.

FIG. 1 shows the input and output variables for one of the discharge modules in the series. The discharge module is represented by block 21, and its associated counter is represented by block 23. Some of the variables shown in FIG. 1 are subscripted; the subscript "I" designates an input variable, and the subscript "0" designates an output variable. The following is a description of each variable shown in FIG. 1:

$INCR_I$. This is the input which increments the "step" or "turn". This signal is ultimately propagated upward through the series. This signal is also called the "step" signal, in this specification.

$INCR_O$. This is the output variable which is connected to $INCR_I$ of the next module, thereby causing the "step" signal to propagate through the series.

$DONE_I$. This is a signal from the succeeding module, and indicates that the succeeding module, and all of its successor modules, have completed their dumping.

$DONE_O$. This is a signal, corresponding to DONEI, which is passed down to the preceding module, to indicate that the present module, and all modules above it, are finished dumping.

$READY_I$. This signal is used to signal a "ready" condition. As will be explained below, the system can operate in two modes, either "manual" or "automatic". In "manual" mode, the "READY" signal must be "on" before the unit can dump. In "automatic" mode, the unit can dump regardless of the status of the "READY" signal. $READY_I$ is the signal which is passed to the present module from its succeeding module.

$READY_O$. This signal corresponds to $READY_I$, and is passed to the preceding module. Note that $READY_O$ does not need to be "on" for the system to begin the next step or "turn". This fact will become clear from the detailed description given later.

COUNTER READY. This signal comes from the counter, and indicates that the counter is ready to dump its contents. When COUNTER READY changes from "on" to "off", it means that the counter has completed its dumping action.

DUMP. This signal is sent to the counter, and causes the counter to dump.

Note that all of the above variables are Boolean variables; they can have only two values (i.e. "on" or "off").

It is understood that some or all of the above variables may assume analog or digital forms, at various times, and may be converted back and forth, as needed. The variables will be described without regard to the particular form they assume at a given time.

In this specification, the above variables will sometimes be identified generically, i.e. without subscripts. For example, $DONE_I$ and $DONE_O$ may sometimes be called a "DONE" signal. Although $DONE_I$ and $DONE_O$ are distinct variables, they are related, insofar as the receipt of a $DONE_I$ signal eventually causes a module to generate a DONE0 signal, such that a "DONE" signal propagates downward through the series. Also, the specification will speak of a "READY" signal, representing $READY_I$ and $READY_O$.

In this specification, the term "operating cycle" will be used in describing the operation of a given module. The term "operating cycle" is distinct from the term "cycle" used above. The "operating cycle" for a particular module begins when that module receives a "step" signal ($INCR_I$) from the preceding module, and ends when the module sends a "DONE" signal ($DONE_O$) to the preceding module. It is important to note that an operating cycle may or may not include a dumping operation. If the particular operating cycle is not a module's "turn" to dump, it will not dump, but the operating cycle will be otherwise complete.

Before beginning the description of the programming of the discharge modules, it is necessary to define the other variables used internally by the program. These variables are as follows:

STAT. This is a "status" variable, and it can assume four possible values, shown below:

i) Begin. In this condition, the counter may begin another operating cycle of counting and dumping.

ii) Wait. This condition means that the module is currently dumping articles. The system must wait for this module to finish. Note that, in automatic mode, although the counters are allowed to dump when ready, all modules must still complete their operating cycles before the system initiates the next operating cycle.

iii) Over. This condition means that this module's operating cycle is complete, but the system is waiting for the succeeding unit to complete its operating cycle also.

iv) End. This condition means that the module has received a $DONE_I$ signal from the succeeding module.

Note that the four possible values of STAT define the operating cycle of the module. However, in an operating cycle in which the module does not dump, the value "Wait" is passed over, and STAT assumes, in sequence, the values "Begin", "Over", and "End".

STEP. This is the variable which contains the number of "step" signals that have been issued by the control unit. It is an integer which is incremented continuously, but is reset to one when its preset LIMIT is reached.

TURN. This is the "turn" number on which the counter associated with the module will dump. In the example of FIG. 2, module 4 dumps when TURN-1.

LIMIT. This is the limit for STEP. In the example of FIG. 2, for modules 1-3, LIMIT=3, and for modules 4-7, LIMIT=4.

NEXT. This variable is defined as STEP+1. Near the end of a given operating cycle, it is used in the setting of the "READY" signals for the next operating cycle.

The programming of the modules can be understood with reference to the flow chart of FIG. 3a-3d. The flow chart shows the programming of any of the discharge modules. The program begins in block 101. In block 103, the program sets STEP equal to 1. In block 105, the program sets the values of the "last inputs" to "off". The program always stores the last values of the input variables ($INCR_I$, $DONE_I$, $READY_I$, and COUNTER READY), for later comparison with current values. In block 106, the program sets the values of the output variables to "off". The latter step initializes these variables when power is first applied to the system.

In order for the program to operate correctly, all the modules must be turned on and allowed to initialize their output variables, to be sure that no modules receive inappropriate signals from neighboring modules when power is applied. This initialization can be done with a timer which forces the modules to wait for the other modules to initialize, or it could be done by other means. This step can be inserted between blocks 106 and 107, for example, of FIG. 3a. All embodiments described in this specification require such initialization.

Figure 3A:
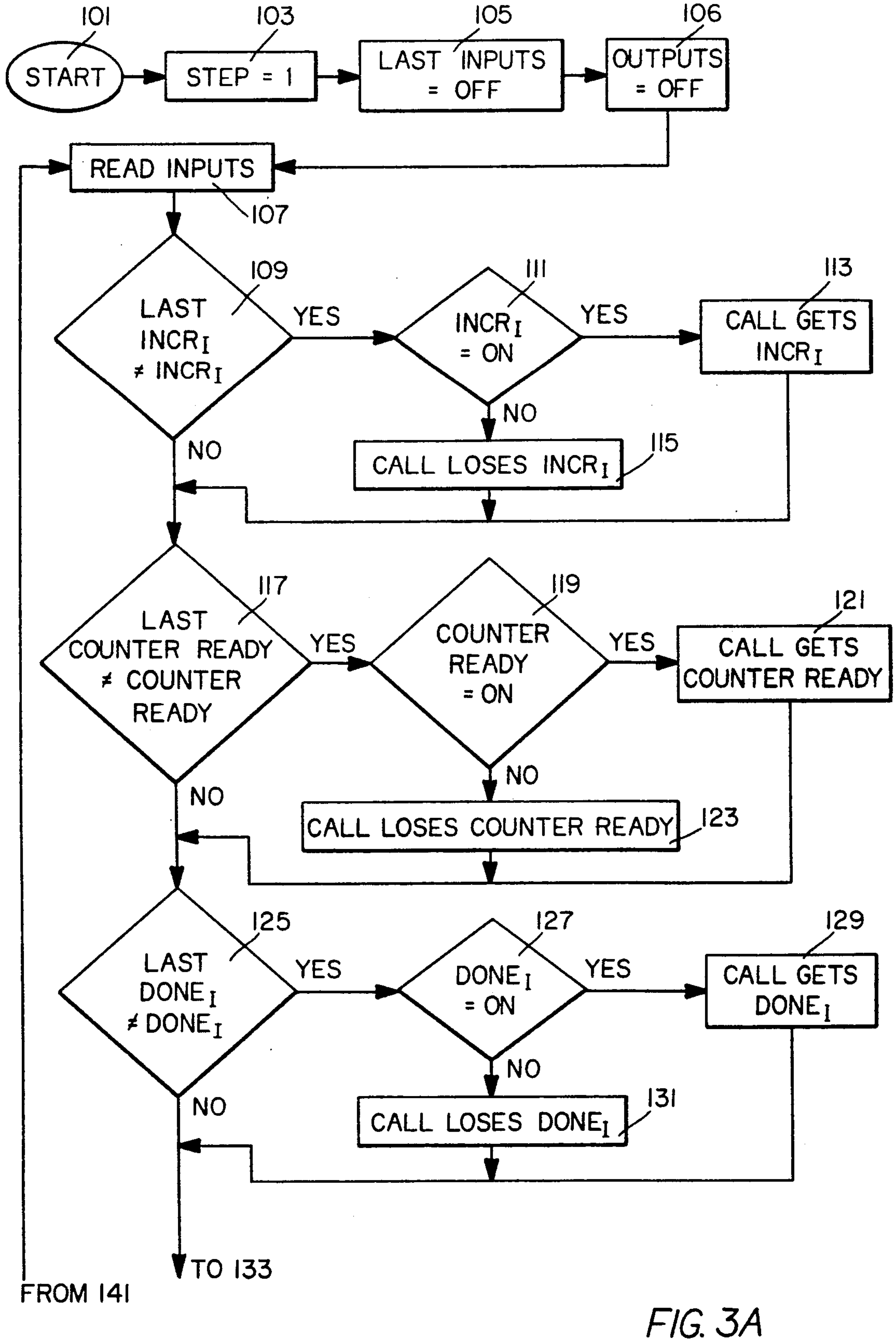
FIGS. 3*a* through 3*f* together comprise a flow chart programming of the computers in each of the discharge modules, according to a first embodiment of the invention.

In block 107, the program reads the current values of the input variables, and performs four tests, indicated by tests 109, 117, 125, and 133 of FIG. 3a. Depending on the results of these tests, the program may enter various subroutines, to be described below.

In test 109, the program determines whether the last stored value of $INCR_I$ differs from the current value of that variable. That is, the system determines whether $INCR_I$ has just changed. If so, the program continues with test 111, to determine whether $INCR_I$ is "on". If so, this means that $INCR_I$ has just changed from "off" to "on". The system then continues in block 113, which calls the subroutine "Gets $INCR_I$". If the result of test 111 is negative, the system proceeds to block 115, which calls the subroutine "Loses $INCR_I$". All subroutines called in FIG. 3a will be described in detail below.

In similar fashion, the system tests the other input variables to see whether they have changed, and calls the appropriate subroutines. Thus, in test 117, the program tests whether COUNTER READY has changed, and test 119 determines whether it has gone from "off" to "on". Depending on the result of the latter test, the system calls either the subroutine named "Gets COUNTER READY" (block 121) or "Loses COUNTER READY" (block 123).

In test 125, the program tests whether $DONE_I$ has changed, and test 127 determines whether it has gone from "off" to "on". Depending on the result of the latter test, the system calls either the subroutine named "Gets $DONE_I$" (block 129) or "Loses $DONE_I$" (block 131).

In test 133, the program tests whether $READY_I$ has changed, and test 135 determines whether it has gone from "off" to "on". Depending on the result of the latter test, the system calls either the subroutine named "Gets $READY_I$" (block 137) or "Loses $READY_I$" (block 139).

In block 141, the program sets the stored "last" values of the inputs equal to their current values. The program then returns to block 107 to read the inputs again.

The details of the eight subroutines, mentioned above, will now be described.

i. Subroutine "Gets $INCR_I$"

Figure 3B:
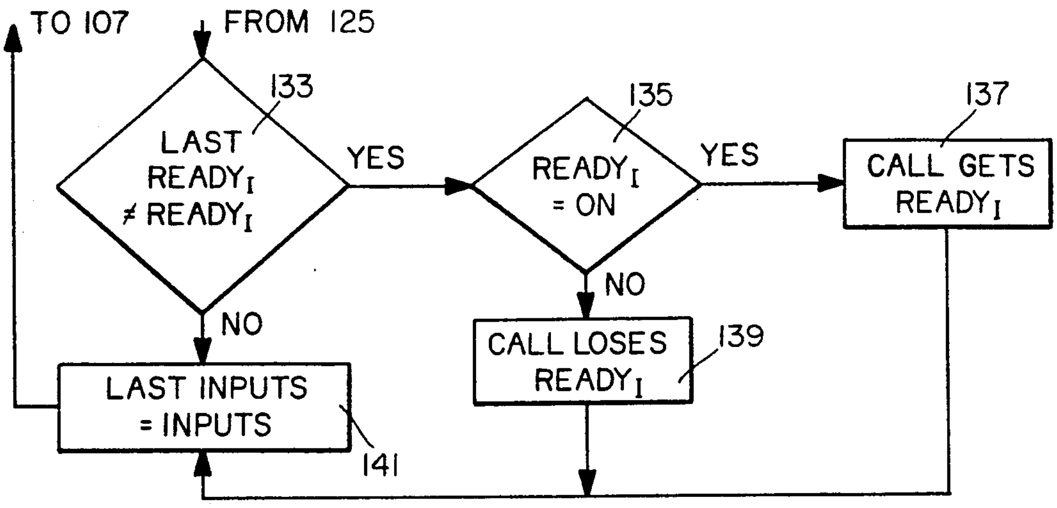

This subroutine begins in block 151 (FIG. 3b). In test 153, the system determines whether the value of STAT is "Begin". If not, the system displays an appropriate error message, in block 155, on a suitable display means. The system can be programmed to stop whenever an error message is displayed. If $INCR_I$ has just changed from "off" to "on", it means that the system is beginning another operating cycle, which should not occur unless the modules are ready for a new operating cycle. Thus, if STAT does not have the value "Begin", at this point, an error condition exists.

If there is no error, the program sets $READY_O$ equal to "off", in block 157. This initializes the "ready" signal; the "ready" signal will be turned on later when the counter is ready, and when the module receives a "ready" signal from the succeeding module. In block 159, the program sets $INCR_O$ equal to "on". This is what makes the "step" signal propagate through the series of modules; recall that $INCR_O$ is connected to $INCR_I$ of the next module. In block 161, STEP is incremented by one.

Test 163 determines whether STEP exceeds LIMIT. If so, STEP is reset to one, in block 165. The system then determines, in test 167, whether STEP equals TURN. The value of TURN is fixed for a particular module, and determines the "turn" on which the module will cause its counter to dump. If STEP equals TURN, the program continues in block 169, and sets STAT equal to "Wait". The value "Wait" means that the present module is performing its operating cycle, and is waiting for the counter to inform the module that the counter is finished dumping. If a particular module is not dumping on this operating cycle, then STAT will never be set to "Wait" in this operating cycle, but is instead set to "Over".

In an alternative embodiment, a counter can dump articles more than once during a cycle. In this case, TURN would need to have more than one value. This objective could be fulfilled by making TURN an array of scalar values. The program would then compare STEP with each value in the TURN array, and prepare for dumping if the upcoming "turn" is listed within that array.

In test 171, the program determines whether COUNTER READY is "on". If so, the counter has accumulated a full measured batch of articles, and is ready to dump them. The program sets DUMP equal to "on", in block 173, and returns to the calling program. Setting DUMP to "on" activates a control signal which causes a door in the counter to open, thereby releasing the counted articles. If COUNTER READY is not "on", the subroutine simply returns to the calling program. The dumping will occur when COUNTER READY changes from "off" to "on", as described later, with respect to Subroutine "Gets COUNTER READY".

If STEP is not equal to TURN, in test 167, then this module must not dump. The program continues in block 175, and sets STAT equal to "Over". The program then determines, in test 177, whether the present module is the last in the series. Each module includes a manually-operated switch, the setting of which indicates that the module is the last in the series. If the module is the last, the program sets STAT equal to "End", in block 179, and sets $DONE_O$ to "on", in block 181. The latter signal will eventually propagate down the series, telling each module that the operating cycle is complete. The subroutine then returns to the calling program. If test 177 shows that the module is not the last, the subroutine returns to the calling point. The module will wait for the succeeding module to complete its operating cycle.

ii. Subroutine "Loses $INCR_I$"

Suppose that $INCR_I$ has changed, but is not currently "on". This means that $INCR_I$ has changed from "on" to "off". The program then calls subroutine "Loses $INCR_I$" (block 183, FIG. *3d*).

In test 185, the program determines whether the value of STAT equals "End". If not, an appropriate error message is displayed. When $INCR_I$ has changed from "on" to "off", the system must be in the condition wherein the modules have completed their cycles. Otherwise, an error condition exists. Such an error could be caused by electrical interference, broken wires, or other causes.

If no error condition is present, the program continues in block 187, and sets $INCR_O$ to "off". This step causes the succeeding module to "lose" its $INCR_I$ signal also. In test 189, the program determines whether the present module is the last in the series. If not, control returns to the calling point. If the module is last, the program continues in block 191, and sets $DONE_O$ to "off". The latter signal tells the preceding module that the present module is finished its operating cycle. The program sets STAT equal to "Begin", in block 193. The program then enters test 195, to determine whether this is the last module. This test is included because this portion of the flow chart is used by another subroutine ("Loses $DONE_I$"), to be described later. In the present case, the answer to test 195 will always be "Yes", and the program continues at label "1", in block 201, also in FIG. *3d*. The following program steps prepare for the next operating cycle.

In block 201, NEXT is set equal to STEP+1, and test 203 determines whether NEXT is greater than LIMIT. If so, NEXT is set to one, in block 205. In test 207, the program determines whether NEXT equals TURN, i.e. whether the next operating cycle will require actual dumping. If so, the program tests whether COUNTER READY is "on", in test 209. If so, the program sets $READY_O$ to "on", in block 211, indicating that the module is ready for dumping. (The $READY_O$ signal has significance only when the system is in manual mode.)

If COUNTER READY is not "on", then the subroutine returns to the calling point without altering $READY_O$. Also, if NEXT is not equal to TURN, the program sets $READY_O$ to "on", in block 213. Although this module will not dump on the next turn, it must signal its readiness to the preceding module.

iii. Subroutine "Gets COUNTER READY"

This subroutine is called when COUNTER READY has changed from "off" to "on". The subroutine begins in block 231, in FIG. *3b*. In test 233, the program determines whether the value of STAT is "Wait". If so, the module is within its operating cycle, and is waiting to dump. The program sets DUMP to "on", in block 235, and returns to the calling point. The counter will now dump its articles.

If the value of STAT is not "Wait", the program determines, in test 237, whether it is "Begin". If the value of STAT is not "Wait" and not "Begin", then the program returns to the calling point, as the operating cycle for the module is not complete.

If STAT has the value "Begin", then the program tests whether $READY_I$ is "on". If so, the program sets $READY_O$ to "on", in block 241, thereby passing the "ready to dump" signal to the preceding module. The program then returns to the calling point. Again, recall that the "ready to dump" signal is needed only for operation in the manual mode.

If, in test 239, $READY_I$ is not "on", the system determines whether the module is the last in the series, in test 243. If so, the program continues in block 241; the last unit thereby generates the "ready to dump" signal which will eventually propagate downward through the series. Otherwise, the program returns to the calling point.

iv. Subroutine "Loses COUNTER READY"

This subroutine is called when COUNTER READY has changed from "on" to "off". The subroutine begins in block 251, in FIG. *3c*. The system determines whether DUMP is "on", in test 253. If so, the program sets DUMP to "off", in block 256, so that the counter will not dump again during this operating cycle. The system also sets STAT to "Over", in block 257. The value "Over" means that the module is in a position in its operating cycle in which the opportunity to dump is past, but the module is waiting for the succeeding unit to complete its operating cycle.

In test 259, the program determines whether $DONE_I$ is "on". If so, the program sets the value of STAT to "End", in block 261 (meaning that the module has received a "DONE" signal from the succeeding module), and sets $DONE_O$ to "on", in block 263. Thus, the "DONE" signal will eventually propagate downward through the series. The program then returns to the calling point.

If the result of test 259 is negative, the program determines whether the module is last in the series, in test 265. If so, the program continues in block 261, as there is no succeeding module to provide a "DONE" signal. If the result of test 265 is negative, the program returns to the calling point. $DONE_O$ may not be set to "on" until $DONE_I$ is received from the succeeding module.

Suppose that the result of test 253 is negative. This could mean that the counter has been manually disabled by the operator, or it could mean some other error condition. In general, when COUNTER READY changes from "on" to "off", indicating that the dumping has been completed, DUMP should have been "on". If the result of test 253 is negative, then the program insures that $READY_O$ is "off", in block 255, and returns to the calling point.

v. Subroutine "Gets $DONE_I$"

This subroutine is called when $DONE_I$ has changed from "off" to "on". The subroutine begins in block 291, in FIG. 3*c*. The program determines whether $INCR_O$ is "on", in test 293. If not, the system displays an appropriate error message, in block 295. The module should not receive a "DONE" signal from succeeding modules if the module has not sent an "INCR" signal upward through the series.

If $INCR_O$ is "on", the program determines whether the value of STAT is "Over", in test 297. If not, the program returns to the calling point, because the present module is presumably still waiting for dumping to be completed. STAT at this point can only be "Wait" or "Over". Returning to the calling point insures that a "Done" signal is not transmitted down the series.

If the value of STAT is "Over", the program sets STAT to "End", in block 299. Recall that the value "Over" means that the operating cycle for this module is essentially complete, but the module is waiting for the succeeding unit to complete its operating cycle also. Since $DONE_I$ has changed from "off" to "on", the program "knows" that the operating cycle for the succeeding module is complete.

The program sets $DONE_O$ to "on", in block 301, thereby enabling the "DONE" signal to propagate downward through the series. The program then returns to the calling point.

vi. Subroutine "Loses $DONE_I$"

This subroutine is called when $DONE_I$ has changed from "on" to "off". The subroutine begins in block 311, in FIG. 3*d*.

The program first determines, in test 313, whether $INCR_O$ is "off". If not, the system displays an appropriate error message, in block 315. If the "DONE" signal is no longer being received from the succeeding module, then $INCR_O$ should not be "on", because setting $INCR_O$ to "off" was what caused $DONE_I$ to be set to "off".

If there is no error, the program continues in block 191, and the following blocks, which were described with respect to Subroutine "Loses $INCR_I$". Note that, in this case, the result of test 195 is always negative, because this module cannot be the last in the series, since it has "lost" the $DONE_I$ signal (which is an input to the module from a succeeding module). The program continues with test 197, which determines whether $READY_I$ is "on". If so, the program continues at label "1", which was described above, to decide whether to turn $READY_O$ to "on". If not, the program returns to the calling point.

vii. Subroutine "Gets $READY_I$"

This subroutine is called when $READY_I$ has changed from "off" to "on". The subroutine begins in block 321, in FIG. 3*d*.

The program determines, in test 323, whether the value of STAT is "Begin". If not, the program returns to the calling point; the program should not set $READY_O$ to "on" until the module is at the beginning of its operating cycle. If STAT is "Begin", the program continues with block 01, and the following blocks, which were described with respect to Subroutine "Loses $INCR_I$".

viii. Subroutine "Loses $READY_I$"

This subroutine is called when $READY_I$ has changed from "on" to "off". The subroutine begins in block 331, in FIG. 3*c*.

The program sets $READY_O$ to "off", in block 333, and returns to the calling point. In this way, the loss of the "READY" signal is propagated downward through the series.

Figure 4:
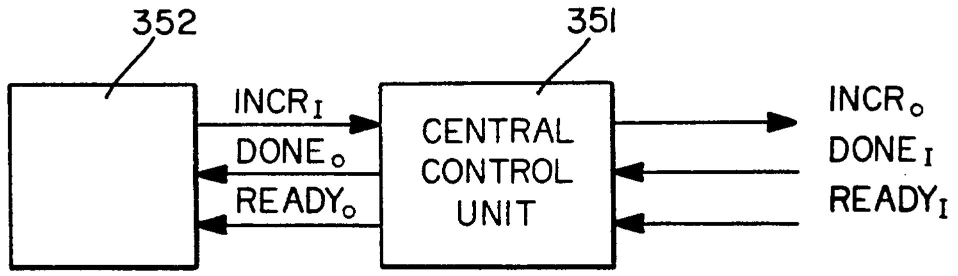
FIG. 4 is a block diagram illustrating the inputs and outputs for the central control unit of the present invention, and showing the external machine which actuates the central control unit.

As mentioned above, the system coordinates the action of the discharge modules through a central control unit. The major purpose of the central control unit is to keep the modules in synchronization, i.e. to insure that all modules are operating on the same "step". The central control unit is also a programmed computer or equivalent. FIG. 4 shows the input and output variables used by the central control unit. The central control unit ("CCU") is designated by reference numeral 351. The input and output variables are the same as those used in the programming of the discharge modules, although, in the embodiment described, the programming of the CCU is different from that of the modules.

Note that there is one input ($INCR_I$) connected to the CCU, and two outputs ($DONE_O$ and $READY_O$) from the CCU. The CCU is connected, through the latter input and output variables, to machine 352. This machine can be, for example, a bagging machine or a blister packaging machine. In the case of a bagging machine, the plurality of counters dump articles into open bags which have been positioned, by the bagging machine, under the chutes of the counters. It is the bagging machine which must "know" when the counters have dumped their articles, so that it can seal the bags and remove them, and place the next batch of bags under the chutes. The machine can take other forms; the invention is not limited by the type of machine which is connected to the CCU.

In addition to the variables shown in FIG. 4, the CCU uses two internal variables, namely STAT and LOCK. STAT is similar to STAT in the discharge modules, except that it can only assume the values "Begin", "Over", and "End". In the CCU, STAT cannot assume the value "Wait" because the CCU is not connected to a counter. LOCK is a boolean variable which determines whether the system is in "manual" or "automatic" mode. When LOCK is "on", the system is in manual mode, which means that all of the discharge modules will cause their counters to dump their articles at exactly the same time. More precisely, in manual mode, the system waits until all the discharge modules have generated a "READY" signal before any dumping occurs. In automatic mode, dumping can begin in the particular modules that are ready, without waiting for the other modules. Note, however, that a new operating cycle will not begin until all counters which are expected to dump articles actually complete their dumping operations.

The $INCR_I$ signal, shown as an input to the CCU, can be generated by a foot pedal, or it can be obtained from a computer or other automatic device. In the case of a foot pedal, the outputs $DONE_0$ and $READY_0$, from the CCU, would not be used, and would not be connected to any other device.

Note that the terms "automatic" and "manual", as used herein, do not signify the use or non-use of a foot pedal. The terms refer only to whether or not the counters can dump when ready. Even if an automatic device is used instead of a foot pedal, the system can still operate in "manual" or "automatic" modes. In the manual mode, the system must wait until all counters are ready for dumping before allowing any counters to dump articles. (Of course, a new operating cycle does not begin until all counters that were supposed to dump have done so.) In the manual mode, the system uses the "READY" signals to determine whether the counters are ready. In the automatic mode, the system allows each counter to dump when it is ready, without waiting for the other counters to become ready. In the automatic mode, the system essentially ignores the "READY" signal, setting it to "on" without regard to the status of an individual counter. The programming for both of these modes is otherwise the same, and will be described below, with respect to FIGS. 4 and 5.

Note that the presence or absence of the foot pedal is also not necessarily correlated with manual or automatic modes. It is possible to be in automatic mode, and also to use a foot pedal to generate the $INCR_I$ signals. In the latter case, one would start an operating cycle by pressing a switch or pedal, and the system would allow each counter to dump when ready. However, for practical reasons, it is generally not preferred to use a foot pedal in automatic mode.

Figure 5A:
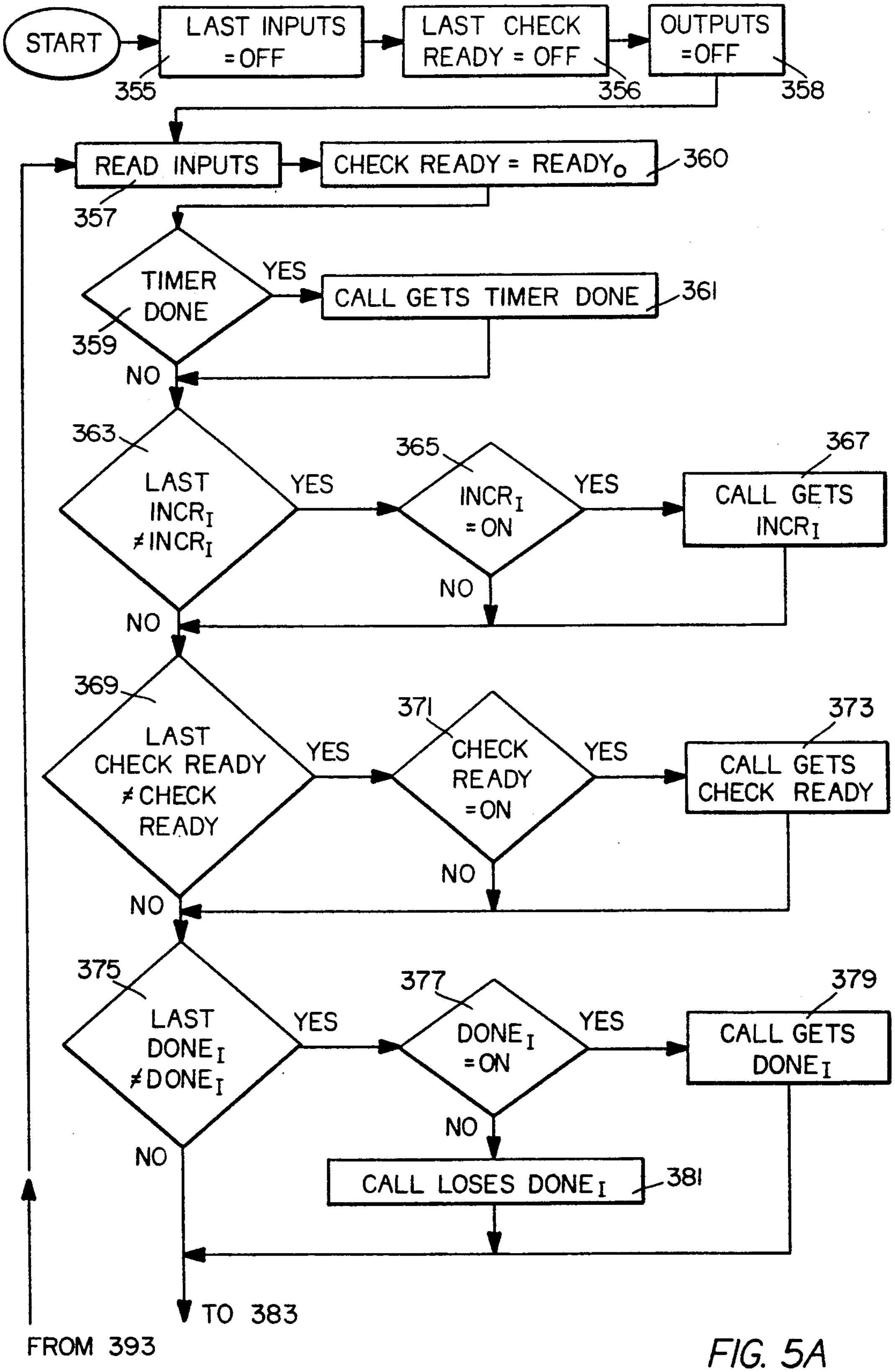
FIGS. 5*a* through 5*e* together comprise a flow chart showing the programming of the computer in the central control unit.
Figure 5B:
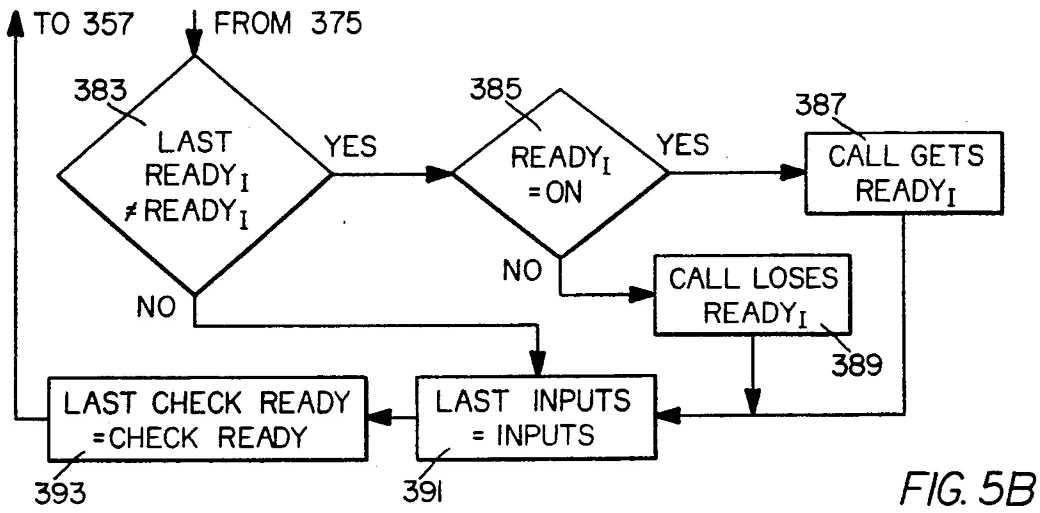
Figure 5C:
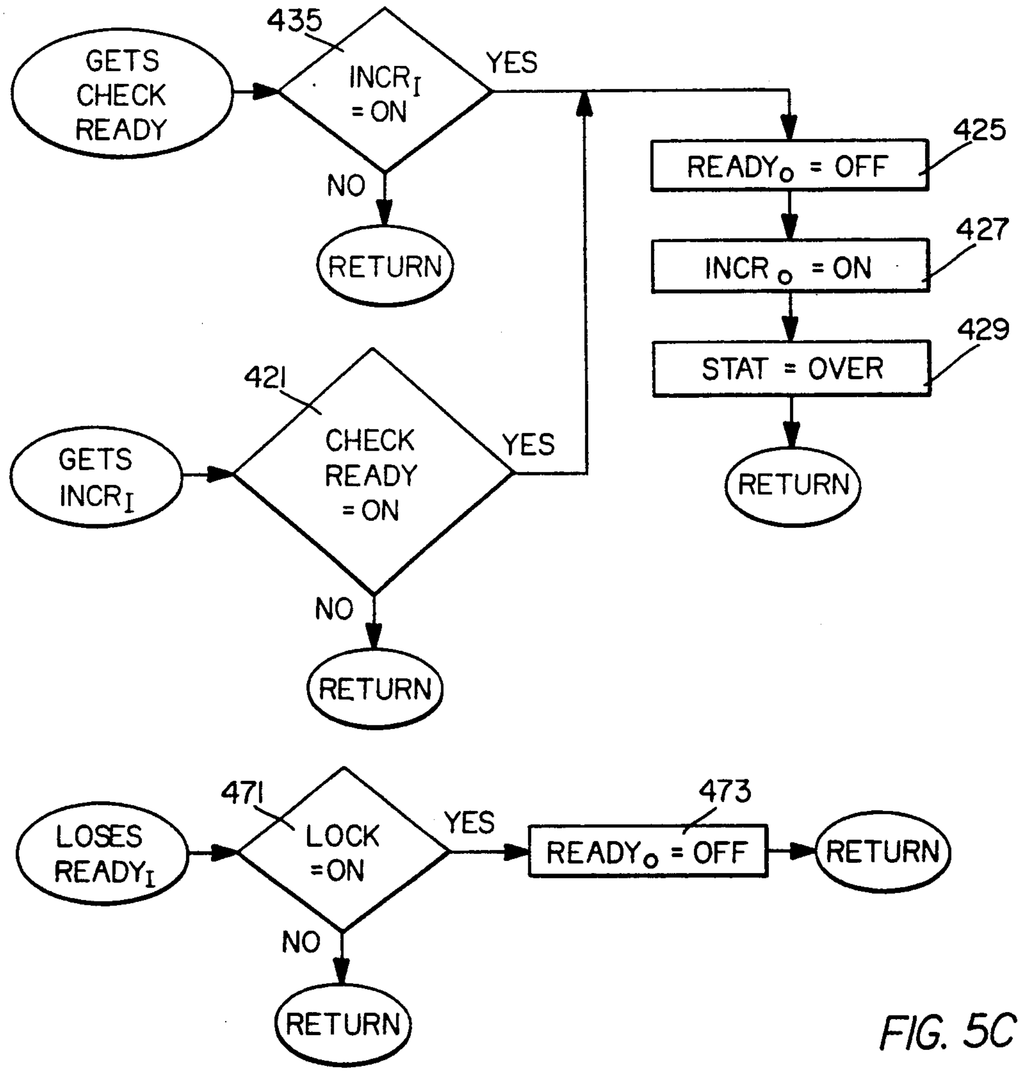
Figure 5D:
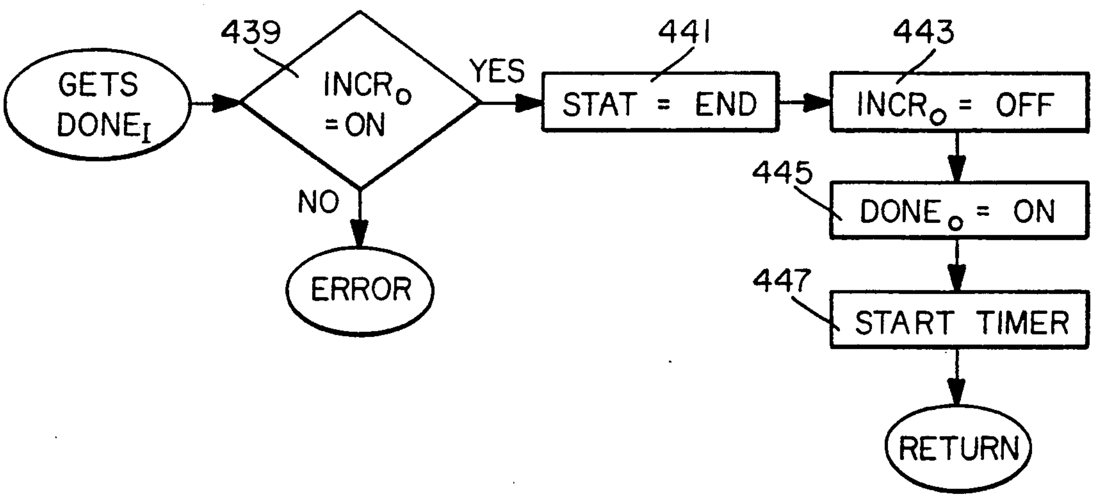
Figure 5E:
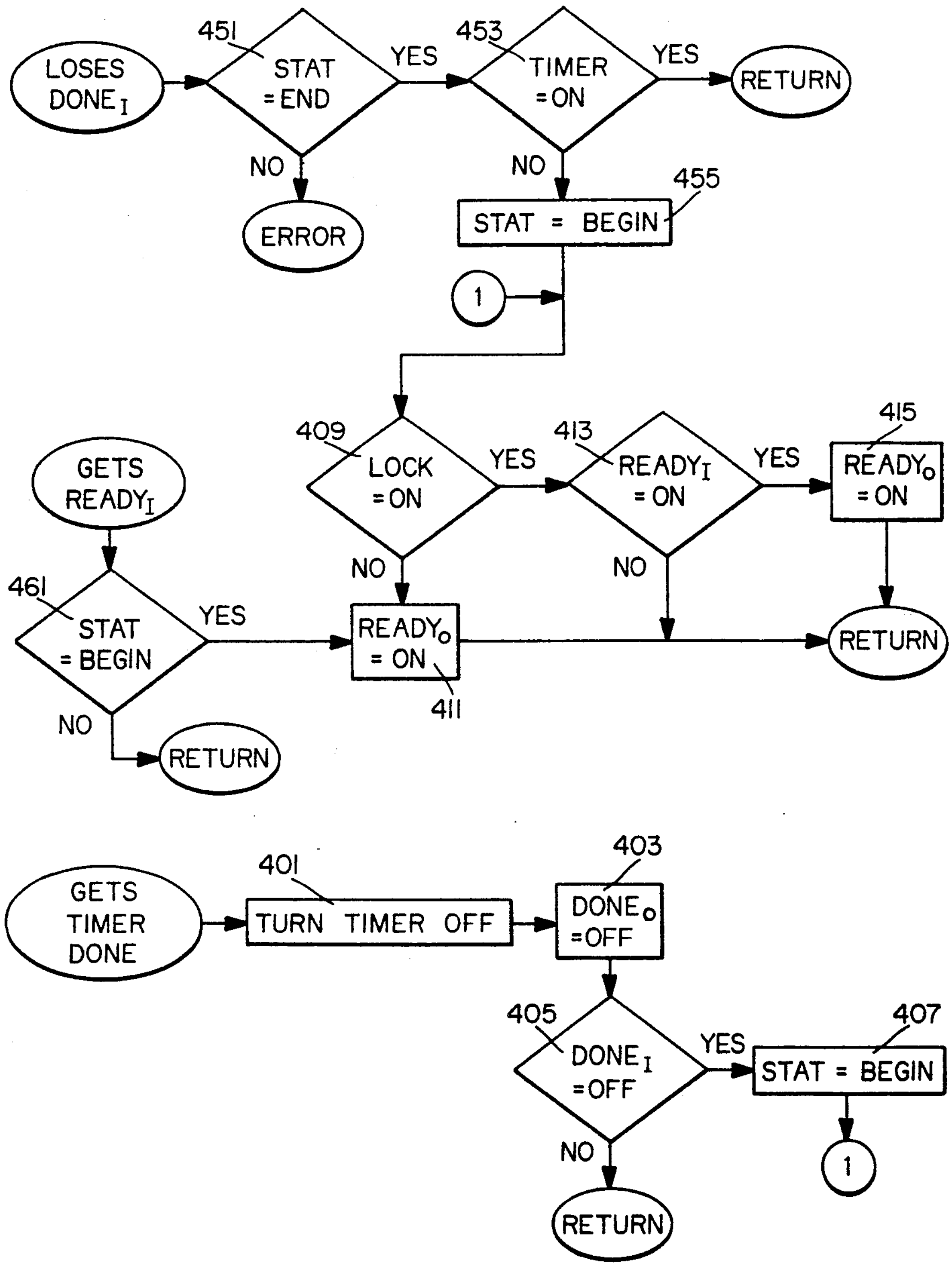

FIGS. 5*a* through 5*c* together comprise a flow chart which shows the programming of the CCU. The overall structure of the program, shown in FIG. 5*a*, is generally similar to that of the program for the discharge modules. However, there are certain differences.

Unlike the discharge modules, the CCU uses a variable called CHECK-READY. CHECKREADY is used to store the initial value of $READY_0$. Although $READY_0$ is an output variable, CHECKREADY is treated by the program as if it were an input. As will be described below, the system will determine whether CHECKREADY has changed from "off" to "on".

As in the discharge modules, the program stores the last values of the input variables. In block 355, the program sets the last values to "off". The system also uses a variable called "LAST CHECKREADY", which is the stored value of CHECKREADY. In block 356, the program sets the value of LAST CHECKREADY to "off". In block 358, the program sets the values of the output variables to "off". Then, the main loop begins in block 357, where the program reads the current values of the inputs. In block 360, the program sets the value of CHECKREADY equal to the value of $READY_0$.

The CCU is equipped with a timer, which may be a physical timing device or an equivalent computer program. The timer is used to insure that a certain minimum interval elapses between the receipt, by the CCU, of a "DONE" signal from the first discharge module, and the initiation of a new operating cycle. In effect, the timer controls how long $DONE_0$ is "on". One must turn $DONE_0$ "off" so that $DONE_0$ will be "off" at the beginning of the next operating cycle. $DONE_0$ must be turned "off" because it was previously turned "on" to signal the completion of an operating cycle; if it is not turned "off", it would stay "on", and the system would not know when the next operating cycle has ended. Thus, the timed interval insures that $DONE_0$ is "off" at the required time.

If a foot pedal is used to generate the $INCR_I$ signal, and the $DONE_0$ and $READY_0$ are not delivered as inputs to any other device, the timer would still operate, since the CCU would not "know" that there is a foot pedal.

In test 359, the program determines whether the timer has been turned on, and whether the interval measured by the timer has elapsed. If so, the program proceeds to block 361, which calls Subroutine "Gets Timer Done". The programming of all the subroutines will be described later.

In test 363, the program determines whether $INCR_I$ has changed. If so, the program determines, in test 365, whether $INCR_I$ is "on". If so, the program proceeds to block 367, and calls Subroutine "Gets $INCR_I$". This step signifies the start of a new operating cycle, provided that $READY_0$ is "on". If the system is in manual mode, it will ignore $INCR_I$ unless $READY_0$ is "on". If the system is in automatic mode, it will have set $READY_0$ to "on" regardless of the status of the individual counters.

Note that the system does not care whether $INCR_I$ changes from "on" to "off". The reason is that once $INCR_I$ has been turned "on", and all other preconditions are fulfilled, the operating cycle will continue without regard to the subsequent status of $INCR_I$. Nothing special occurs when $INCR_I$ changes to "off".

Note also that $INCR_I$ is not turned off internally, by the program. Instead, it is turned off from the "outside", i.e. by a foot pedal or by the external machine 352 connected to exchange inputs and outputs with the CCU.

It is possible to check when $INCR_I$ changes from "on" to "off", for diagnostic purposes, i.e. to be sure that $INCR_I$ has not become accidentally "frozen" in the "on" state. Such a diagnostic check could be added to the program, but is not absolutely necessary.

In test 369, the program determines whether CHECKREADY has changed. If so, the program tests, in test 371, whether CHECKREADY is "on". If so, the program calls Subroutine "Gets CHECKREADY", in block 373. Note that the program does not care if CHECKREADY changes from "on" to "off". As in the case of $INCR_I$, there is nothing that needs to happen when CHECKREADY changes from "on" to "off". It is only when CHECKREADY changes from "off" to "on", and $INCR_I$ is "on", that the CCU can begin another operating cycle. Indeed, as can be seen from the flow charts, the program turns $READY_0$ "off" (thereby eventually turning CHECKREADY "off") immediately at the beginning of an operating cycle.

In test 375, the program determines whether $DONE_I$ has changed. If so, the program tests, in test 377, whether $DONE_I$ is "on". If so, the program continues in block 379, which calls Subroutine "Gets $DONE_I$". If $DONE_I$ has changed from "on" to "off", then the program calls Subroutine "Loses $DONE_I$", in block 381.

In test 383, the program determines whether $READY_I$ has changed. If so, the program tests, in test 385, whether $READY_I$ is "on". If so, the program continues in block 387, which calls Subroutine "Gets $READY_I$". If $READY_I$ has changed from "on" to "off", then the program calls Subroutine "Loses $READY_I$", in block 389.

The main loop of the program for the CCU concludes in block 391, in which the stored values of the input variables are set equal to their current values, and in block 393, in which the stored value of CHECKREADY is set equal to the current value of CHECKREADY. The program then returns to block 357.

The programming of the various subroutines for the CCU will now be described.

i. Subroutine "Gets Timer Done"

This subroutine is shown in FIG. *5c*. When this subroutine is called, the program first turns the timer off, in block 401. The timer is used to establish a minimum interval which must elapse between the receipt of a "DONE" signal from the first module, and the initiation of the next operating cycle. In block 403, the program sets $DONE_0$ to "off", which is a prerequisite for the start of a new operating cycle. In test 405, the program determines whether $DONE_I$ is "off". If not, the program returns to the calling point, and does not prepare for a new operating cycle, since the discharge modules are not finished their operating cycles.

If the result of test 405 is in the affirmative, the program proceeds to block 407, which sets STAT equal to "Begin", and continues at label "1", also in FIG. *5c*. The program tests, in test 409, whether LOCK is "on". If not (meaning that the system is in automatic mode), the program sets $READY_0$ to "on", in block 411, and returns to the calling point. Setting $READY_0$ to "on" allows the counters to dump their articles when they are ready, without waiting for the other modules to become ready. This is how the program "forces" the READY signal to be "on".

If the result of test 409 is in the affirmative, then the program determines, in test 413, whether $READY_I$ is "on". If so, the program sets $READY_0$ to "on", in block 415, and returns to the calling point. This means that the CCU has learned that all the counters in the series are ready to dump, and therefore generates its own "ready" signal. If the result of test 413 is negative, meaning that the system is in manual mode and $READY_I$ is "off", then the system is not ready to dump, and the program returns to the calling point.

ii Subroutine "Gets $INCR_I$"

This subroutine is shown in FIG. *5b*. The program determines, in test 421, whether CHECKREADY is "on". If not, the program returns to the calling point. CHECKREADY should be "on" at this point, before a new operating cycle can begin (recall that, in manual mode, all counters must be ready to dump; in automatic mode, the program forces $READY_0$ to be "on" for each module, and therefore CHECKREADY must also be "on"). If CHECKREADY is not "on", the program must wait before beginning the new operating cycle.

If the result of test 421 is affirmative, then the program sets $READY_0$ to "off", in block 425. (Recall that $READY_0$ is "off" during the operating cycle, and, in manual mode, it is "off" until all the counters in the series are ready. In automatic mode, $READY_0$ changes to "on" as soon as the timed interval is completed, and $DONE_I$ has turned "off".) The program sets $INCR_0$ to "on", in block 427, and sets the value of STAT to "Over", in block 429. The purpose of block 427 is to cause the "INCR" or "step" signal to propagate upward through the series. STAT is set in block 429 to indicate that the operating cycle is in progress, and the program returns to the calling point. Recall that STAT cannot assume the value "Wait", in the CCU, because the CCU is not connected to a counter.

iii. Subroutine "Gets CHECKREADY"

This subroutine is illustrated in FIG. *5b*. This subroutine is called when CHECKREADY changes from "off" to "on".

In test 435, the program determines whether $INCR_I$ is "on" the system returns to the calling point, since the machine or operator is not requesting the counters to dump their articles, and thus the program should not initiate dumping. If the result is affirmative, then the program continues with test 423, and the following steps, which have been described above. These steps essentially cause the next operating cycle to begin.

iv. Subroutine "Gets $DONE_I$"

This subroutine is illustrated in FIG. *5b*. This subroutine is called when $DONE_I$ changes from "off" to "on".

In test 439, the program determines whether $INCR_0$ is "on". If not, the program generates an appropriate error message, and halts. A "DONE" signal should not have been received unless an "INCR" signal had been transmitted upward through the series.

If there is no error, the program continues in block 441, and sets the value of STAT to "End". The operating cycle is near its conclusion. The program sets INCRO to "off", in block 443, and sets $DONE_0$ to "on", in block 445. Also, the program starts the timer, in block 447, to insure that the next operating cycle does not begin before the necessary time interval has elapsed. The program then returns to the calling point.

v. Subroutine "Loses $DONE_I$"

This subroutine is illustrated in FIG. *5c*, and is called when $DONE_I$ changes from "on" to "off".

The program determines, in test 451, whether the value of STAT is "End". If not, the system generates an appropriate error message, and halts. If the "DONE" signal has just changed from "on" to "off", the value of STAT should have been "End", as the program is at the end of its operating cycle.

If the result of test 451 is affirmative, the program determines, in test 453, whether the timer is on. If the timer is on, the program returns to the calling point, as the purpose of the timer is to delay initiation of a new operating cycle until the required time interval has elapsed.

If the timer is not on, the program continues in block 455, where the value of STAT is set to "Begin". The latter step prepares the system for the beginning of the next operating cycle. The program continues in test 409, and the following steps, which have been described previously.

vi. Subroutine "Gets $READY_I$"

This subroutine is illustrated in FIG. 5*c*, and is called when $READY_I$ changes from "off" to "on".

The program determines, in test 461, whether the value of STAT is "Begin". If not, the program returns to the calling point, as the program should not initiate a new operating cycle until STAT has the value "Begin".

If the value of STAT is "Begin", then the program continues with block 411, and sets $READY_0$ to "on". The program then returns to the calling point.

vii. Subroutine "Loses $READY_I$"

This subroutine is illustrated in FIG. 5*b*, and is called when $READY_I$ changes from "on" to "off".

The program determines, in test 471, whether LOCK is "on". If not, meaning that the program is in automatic mode, the program returns to the calling point. Recall that, in automatic mode, the program does not care whether the counters are ready, but in manual mode, it will prevent the system from starting the next operating cycle until all the counters are ready again.

If LOCK is "on", the program continues in block 473, where $READY_0$ is set to "off". The latter step prevents any counter from dumping until all the counters are ready. The program then returns to the calling point.

Note that, as a consequence of the program logic discussed above, the program, when in automatic mode, does not require that the "READY" signal be "on" in order for a given counter to dump articles. A counter can dump while waiting for the other counters to dump, and can begin accumulating a new quantity of articles. Since the time to count a given quantity of articles can vary considerably from one batch to the next, the process of dumping the contents of all the counters can be speeded considerably by allowing each counter to dump when ready. Note, however, that the program does not begin the next operating cycle until all counters which are intended to dump on this cycle, have completed their dumping.

In the program described above, the first discharge module and the CCU are distinct units. It is also possible to combine the CCU with the first discharge module. There are two primary means of achieving the combination. One is to allow the microprocessor in the first module to execute both the discharge module program and the CCU program, as described above, on a "time-shared" basis. That is, the microprocessor would rapidly and alternately execute the CCU program and the discharge module program, such that both programs would appear to be executed simultaneously. The inputs and outputs that are passed between the CCU and the first discharge module would be passed by software, and not by a hardware connection. The programming of the modules could still be identical, with the portion of the program relating to the CCU being disabled in all but the first of the modules.

In another embodiment, the CCU and the first discharge modules operate according to one integrated program. In this case, the first module would be programmed differently from the second and succeeding modules. But the second and succeeding modules would be programmed identically, as shown in FIG. 3. In this embodiment, all of the modules can dump articles, since the first module acts as both the CCU and the first discharge module.

FIGS. 6*a* through 6*d* illustrate the programming of the module which includes the CCU and first discharge module in combination. Because this program is virtually a simple combination of the programs illustrated in FIGS. 3 and 5, it is not necessary to provide a detailed explanation of every block. Instead, the following description will identify the source of each portion of FIG. 6.

Figure 6A:
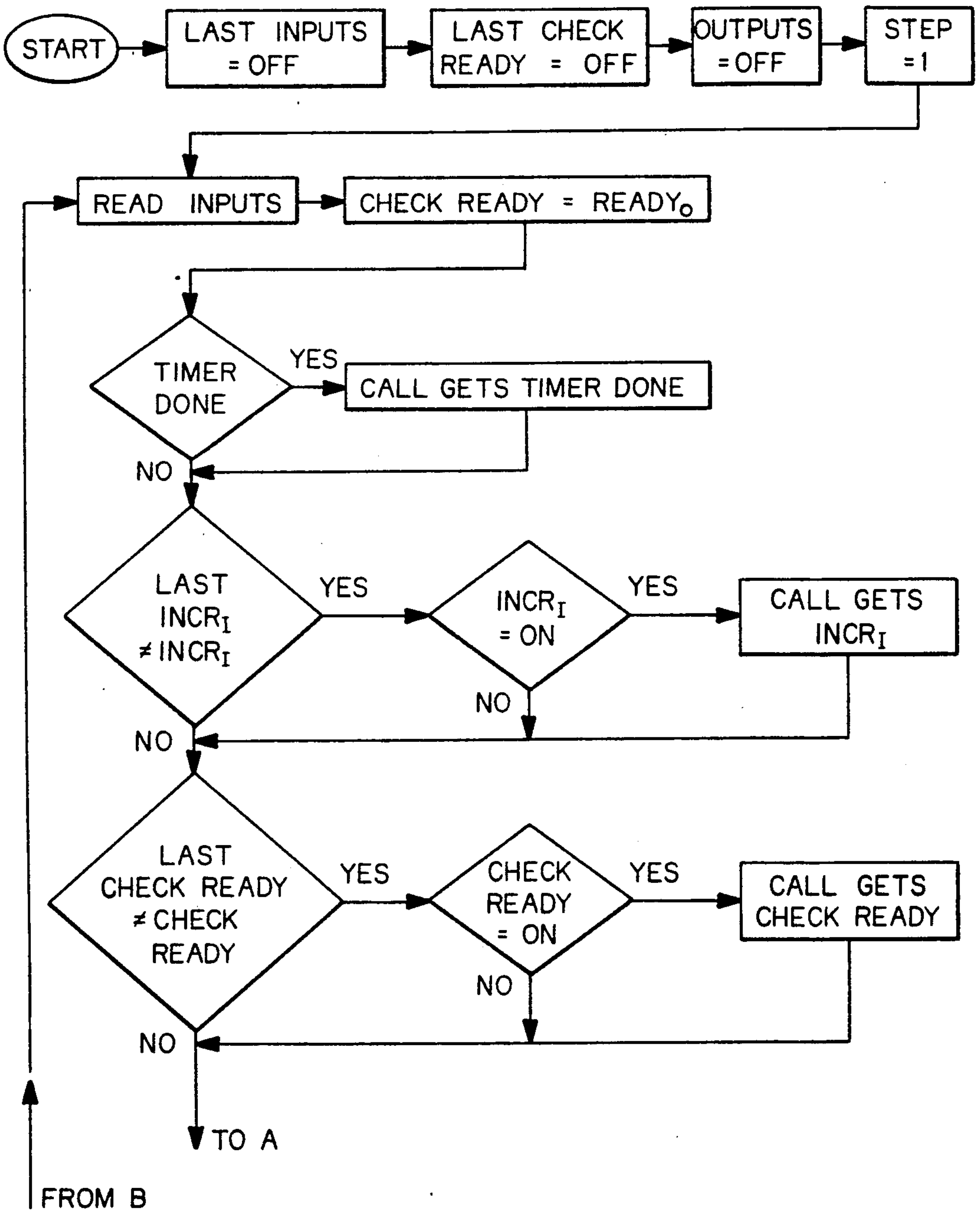
FIGS. 6*a* through 6*e* together comprise a flow chart showing the programming of the computer in the first discharge module, so as to combine the functions of the first discharge module with those of the central control unit.

FIG. 6*a* is derived from FIGS. 5*a* and 3*a*. FIG. 6*a* contains all of the programming shown in FIG. 5*a*. FIG. 6*a* also includes the proram step which sets STEP equal to one, at the beginning, and the program loop which determines whether COUNTER READY has changed. The latter two features are taken directly from FIG. 3*a*. Thus, FIG. 6*a* contains all of the features of FIGS. 5*a* and 3*a*. The order of execution of the program loops (such as the loop which tests whether $INCR_I$ has changed), in FIG. 6*a*, is not important.

Figure 6B:
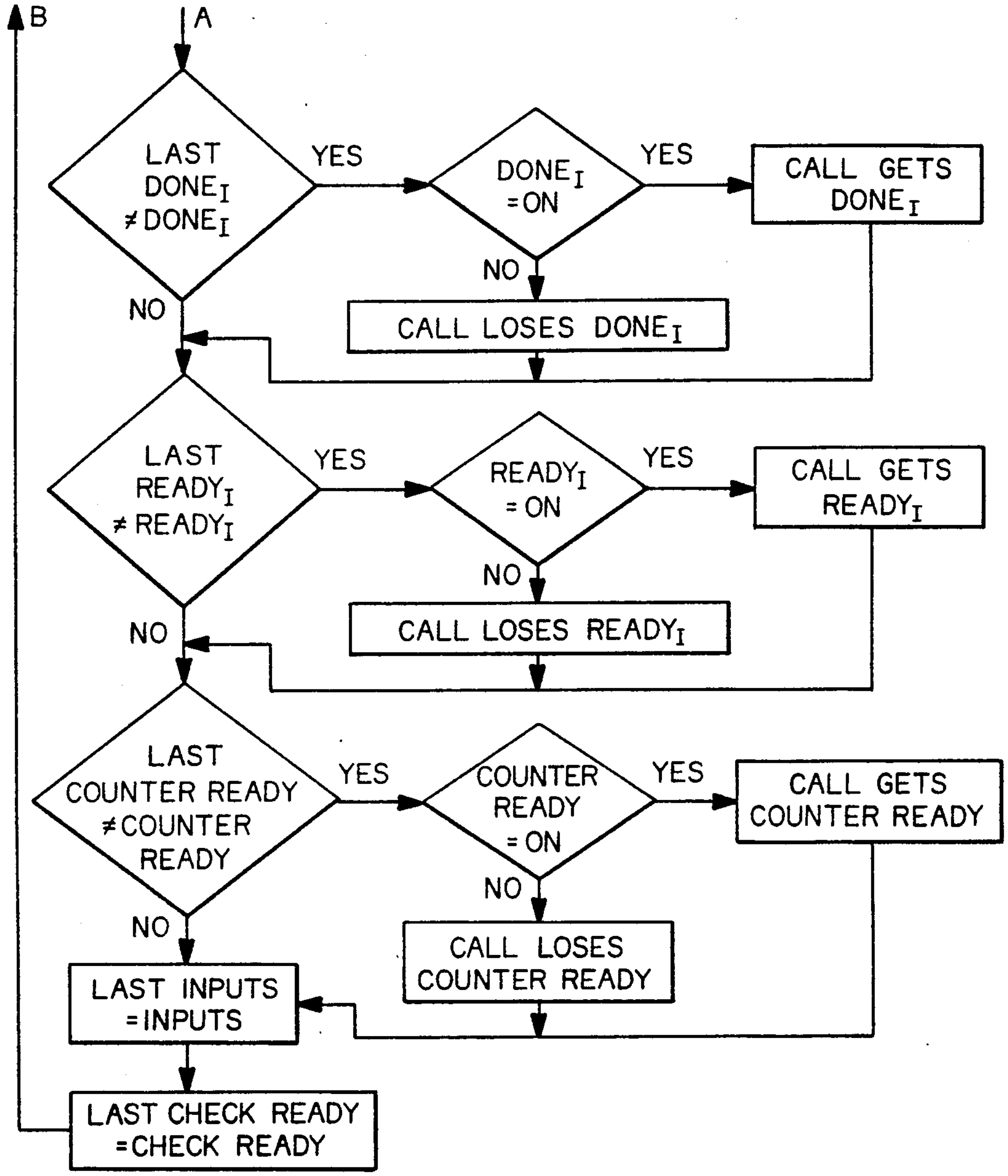

FIG. 6*b* contains blocks similar to blocks 435 and 421 of FIG. 5*b*, and also blocks 157 through 175 of FIG. 3*b*. Note that blocks 161 through 173, of FIG. 3*b*, are associated with dumping, and therefore these blocks have no counterparts in FIG. 5*b*. Subroutine "Gets COUNTER READY" in FIG. 6*b* is based on blocks 231 through 241 of FIG. 3*b*. Note that the tests for "last unit" have been eliminated (i.e. by assuming that the current module is not the last one) because the module represented by the program of FIG. 6 is, by definition, the first module.

Figure 3C:
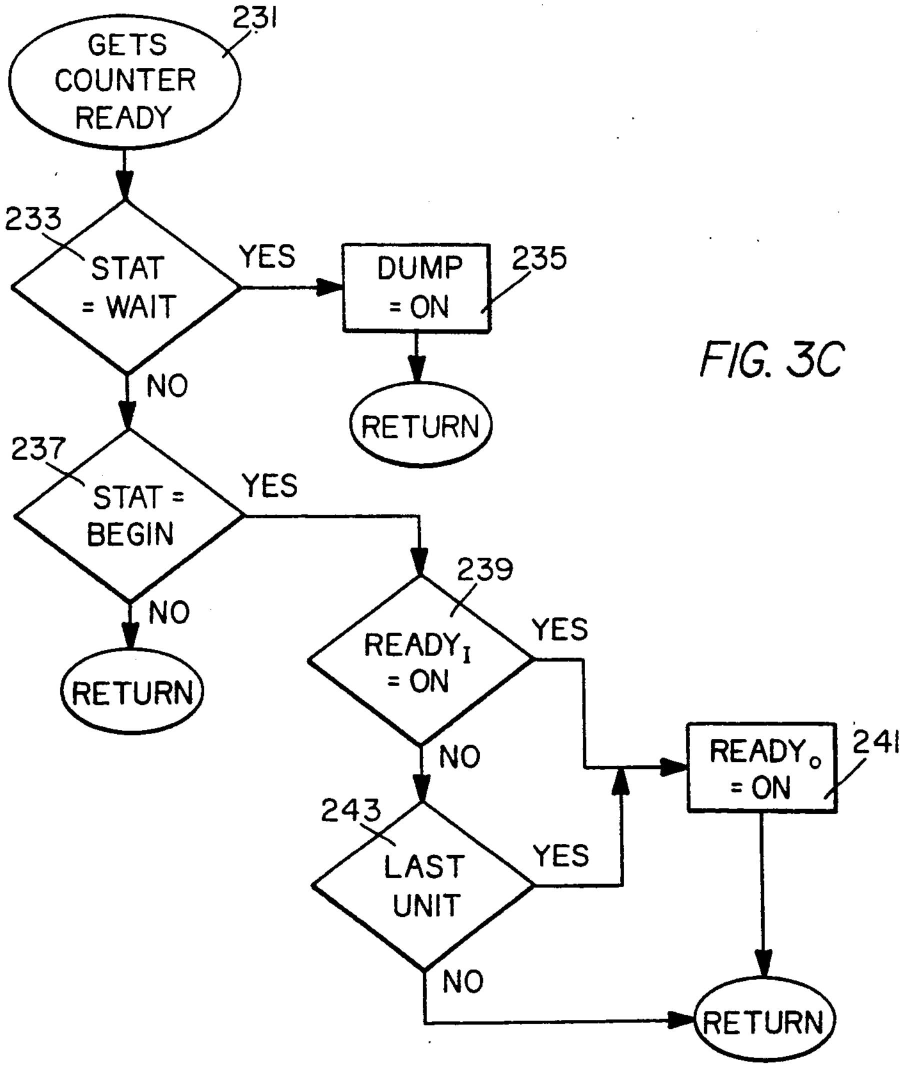
Figure 6C:
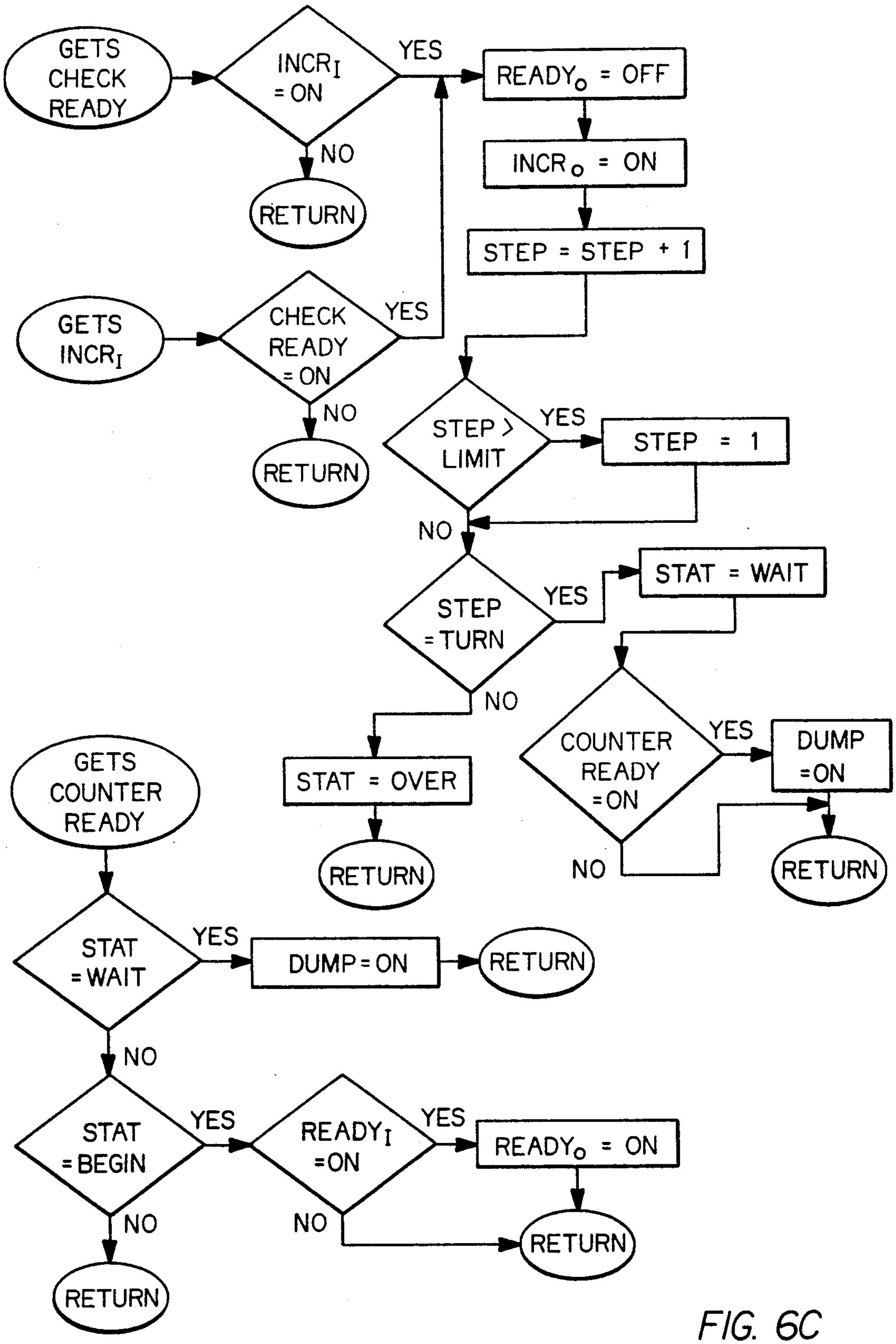

FIG. 6*c* contains blocks similar to blocks 251 through 259 of FIG. 3*c*, plus blocks similar to blocks 441 through 447 of FIG. 5*b*. Subroutine "Loses COUNTER READY", for a discharge module, can be considered to be related to Subroutine "Gets $DONE_I$", for the control module, because when the COUNTER READY signal turns "off", the discharge module will transmit a DONE signal downward through the series, so that the control module will eventually execute Subroutine "Gets $DONE_I$". Subroutine "Gets $DONE_I$" contains blocks similar to blocks 291 through 297 of FIG. 3*c*, and blocks 441 through 447 of FIG. 5*b*. Subroutine "Loses $READY_I$" is similar to that of FIG. 5*b*. Again, note that it is assumed that the current module is not the last unit.

Figure 3D:
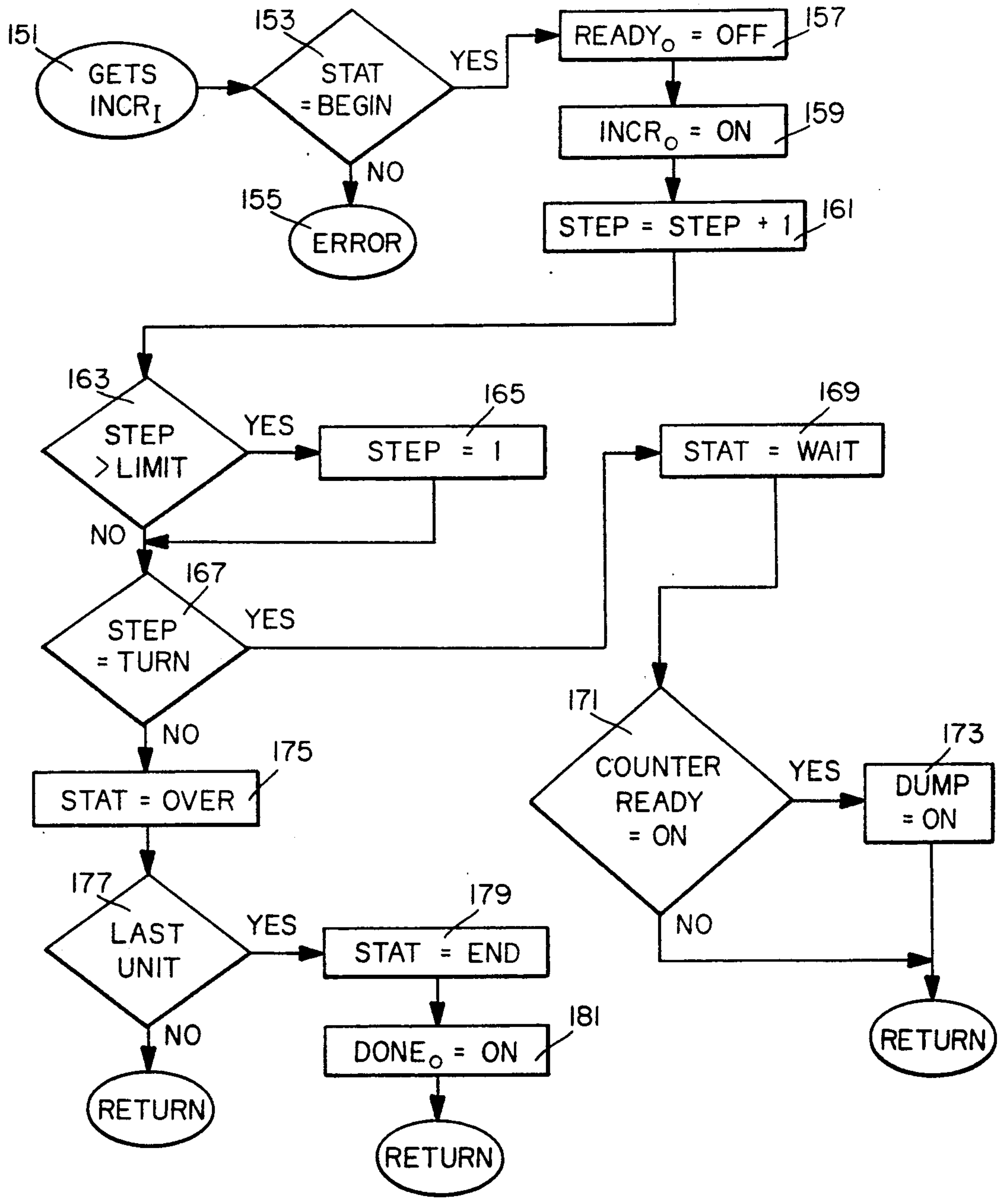
Figure 3E:
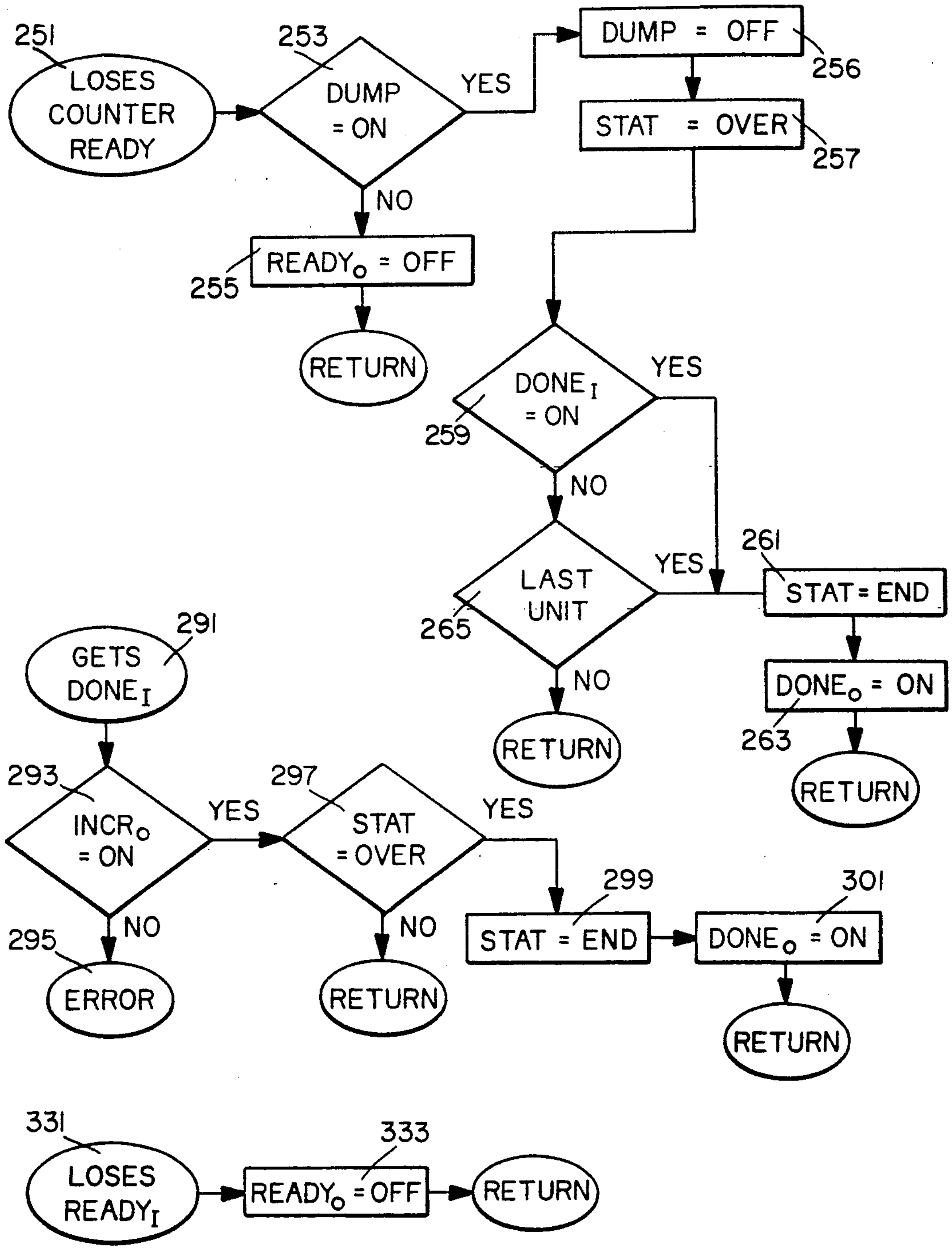
Figure 3F:
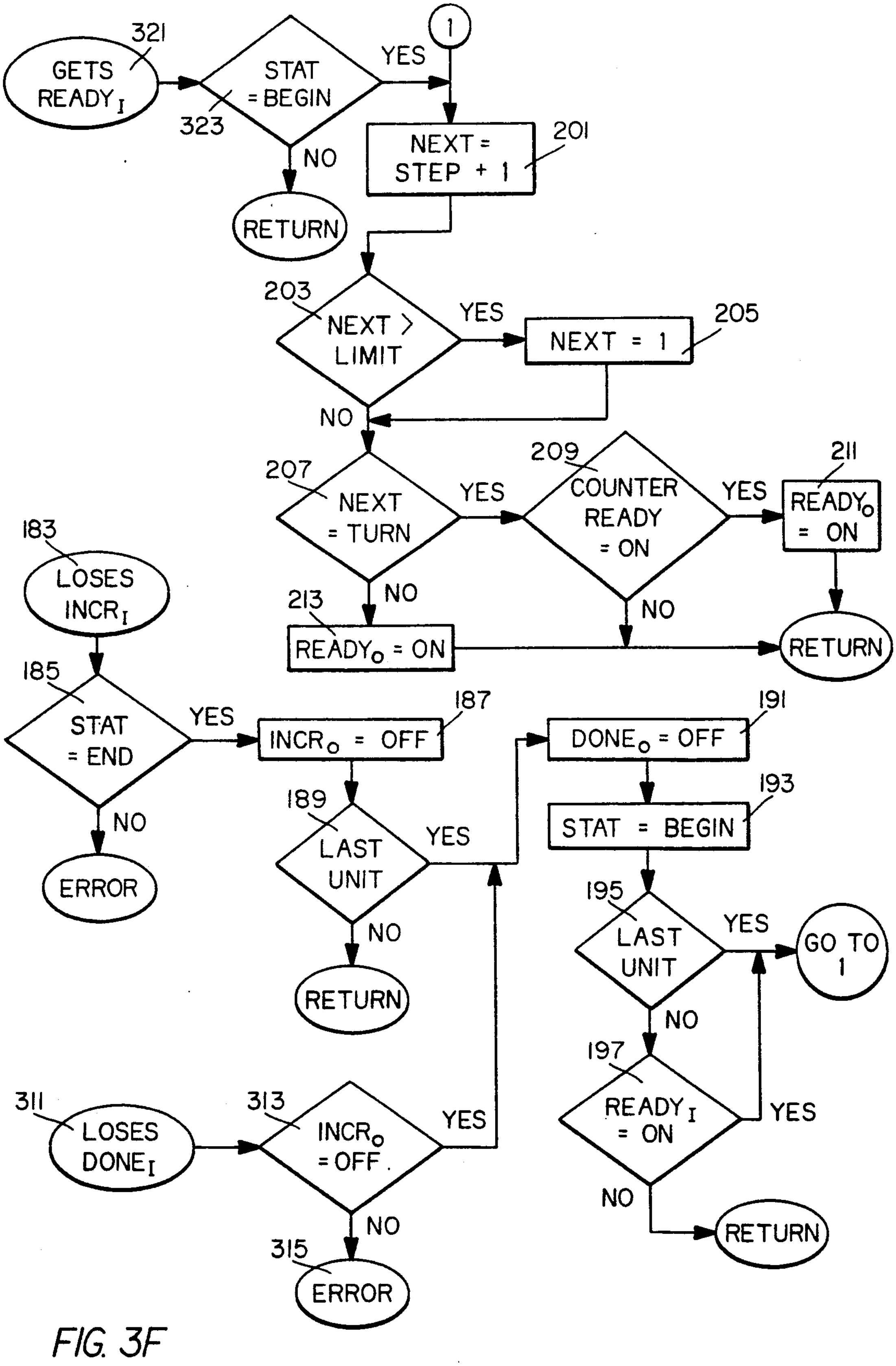
Figure 6D:
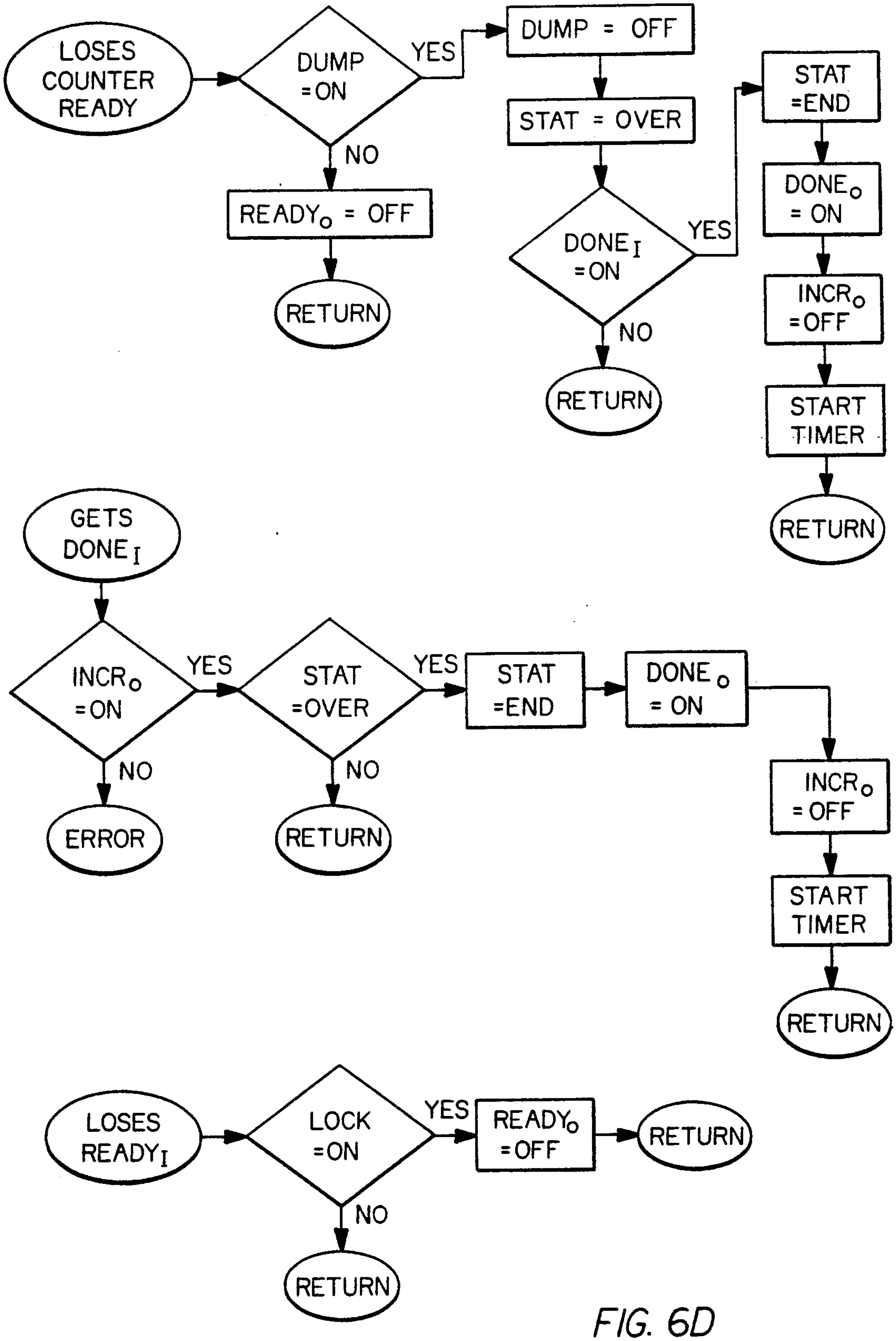
Figure 6E:
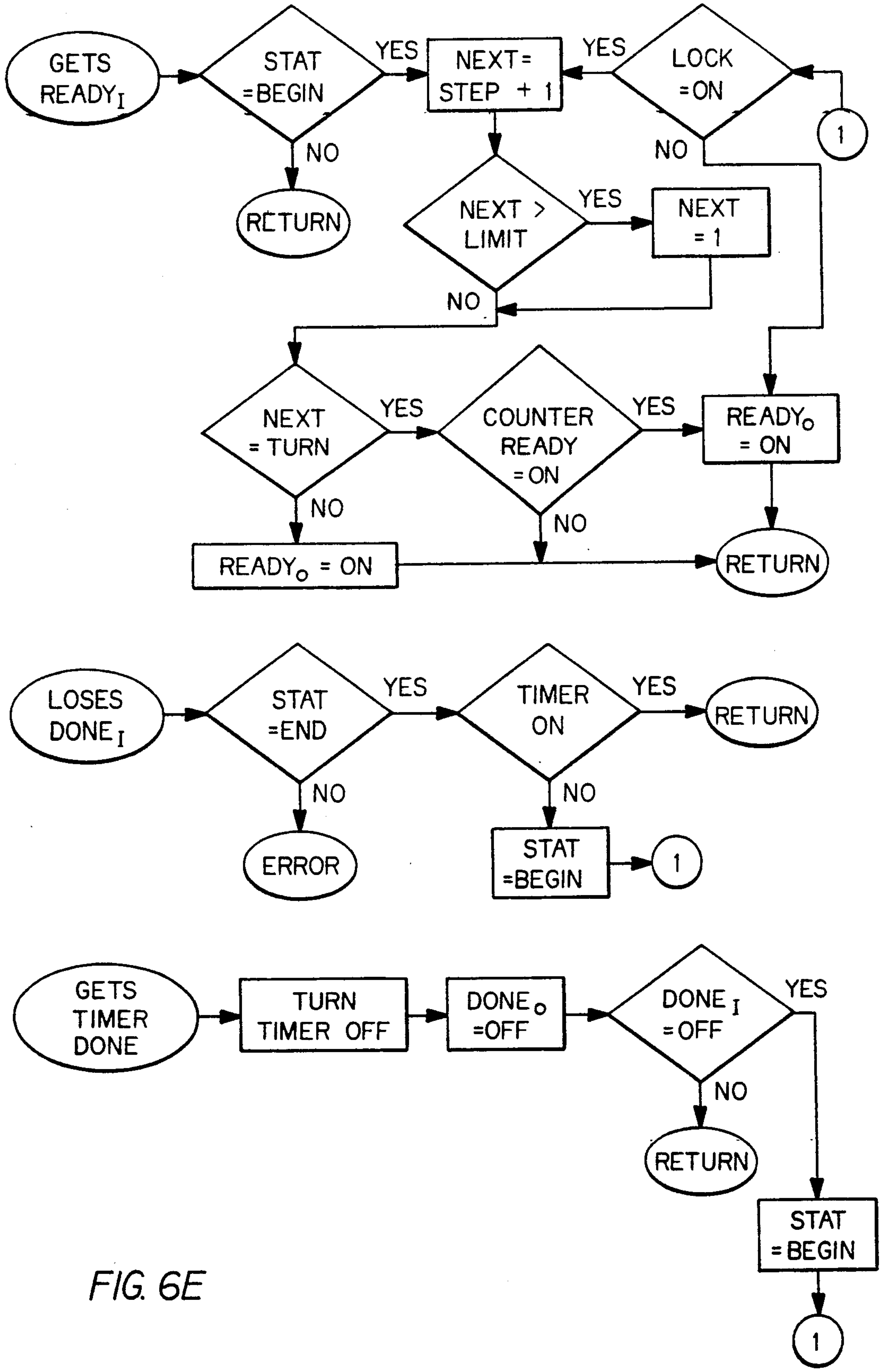

In FIG. 6*d*, Subroutine "Gets $READY_I$" is the same as in FIG. 3*d*. Subroutine "Loses $DONE_I$" is similar to blocks 451 through 455 of FIG. 5*c*, but it also continues with a check for the status of LOCK, and continues with blocks which are similar to blocks 201 through 213 of FIG. 3*d*. Subroutine "Gets Timer Done" contains blocks similar to blocks 401 through 407 of FIG. 5*c*, and continues with label "1", as shown.

FIGS. 7 and 8*a* through 8*c* illustrate an embodiment wherein the modules dump articles only one at a time, and on a "when ready" basis. No two modules in a given series will dump simultaneously, although simultaneous dumping could be achieved by operating several different chains of counters, as in FIG. 2. In this embodiment, a separate CCU is not required; all control functions are built into one program. The inputs and outputs are connected directly with the bagging machine, or other machine, which controls the apparatus.

This embodiment is particularly useful when all the counters are counting the same kind of articles.

Figure 7:
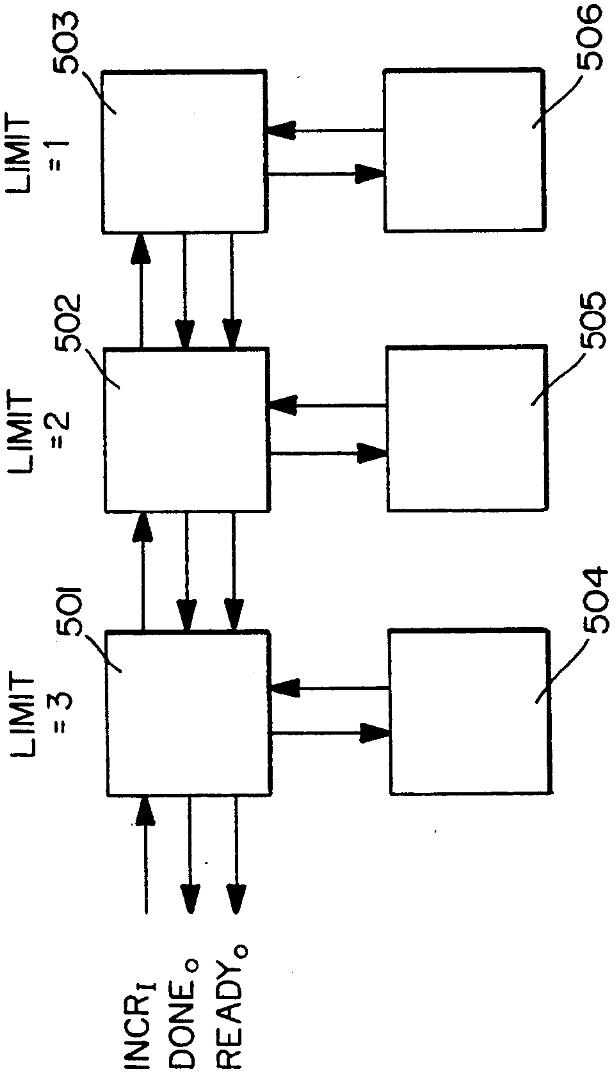
FIG. 7 is a block diagram illustrating the operation of an alternative embodiment, wherein only one of the discharge modules can dump articles at one time, and wherein the discharge modules dump articles on a "when ready" basis.

FIG. 7 illustrates the basic operation of the latter embodiment. FIG. 7 shows modules 501, 502, and 503 connected, respectively, to counting devices 504, 505, and 506. Each module "wants" to dump its articles when the value of STEP is 1. The value of LIMIT is fixed for each module, and is different for each module. In the example shown, the values of LIMIT, for the three modules, are 3, 2, and 1, respectively. In general, if the series has n modules, the respective values of LIMIT are n, (n−1), (n−2), etc., with the last module having the value of LIMIT=1.

The following is a general description of the operation of the embodiment of FIGS. 7 and 8. In general, all modules "want" to dump on the first turn of the cycle. Whether dumping occurs on that turn depends on whether the module is ready. Suppose, for example, that module 501 (having LIMIT=3) receives an $INCR_I$ signal. If that module is ready, it will dump and generate a DONE signal to the bagging or other machine. The next $INCR_I$ signal causes an increment to the STEP variable. Since module 501 is programmed to dump on its first turn (i.e. when STEP=1), that module does not dump when STEP=2, but instead transmits the $INCR_I$ signal to module 502. Module 502 "sees" the present turn as its first turn (STEP=1). Thus, module 502 will dump, if ready, and will transmit a DONE signal down the series. The next $INCR_I$ signal will, in similar fashion, be passed up the series by modules 501 (in which STEP=3) and 502 (in which STEP=2), and will cause module 503 to dump, if it is ready, and to transmit a DONE signal down the series. Note that, at this point, for module 501, STEP=3, for module 502, STEP=2, and for module 503, STEP=1. (This arrangement contrasts with the previously described embodiments, wherein the value of STEP is the same for all modules in the series.) When the next $INCR_I$ signal is received, the value of STEP, for module 501 reset to 1. Similarly, when an $INCR_I$ signal reaches the other modules, their values of STEP will also be set to 1, because STEP is reset after it reaches the value of LIMIT. This arrangement allows the counters, if ready, to dump in a sequential manner, using articles evenly from all the counters. It is advantageous to dump articles evenly from all counters, so that all the counters can process articles at approximately an equal rate, thereby avoiding undue wear on any one counter.

If any of the counters are not ready, the above-described procedure is modified. Each module monitors the value of COUNTER READY, generated by its associated counter, and if the counter is ready, the module generates a READY signal which propagates downward through the series. When the signal reaches the first module, the first module turns $READY_0$ "on". This step allows $INCR_I$ to start the operating cycle.

If a module is not ready, and if its $READY_I$ signal is "on", the module "knows" that there is another module, further up the series, which is ready to dump. In this case, the module transmits an $INCR_I$ signal upward, and that signal will eventually cause a dumping action. A module transmits an $INCR_I$ signal up the series if the module is not ready to dump, or if the current "turn" is not this module's "turn" to dump (and $READY_I$ is "on"). The $INCR_I$ signal is transmitted up the series, until it reaches a module which is ready to dump.

If more than one module is ready, the first module to dump will be the module whose turn it is. If two or more modules are ready, and it is not the turn of either module, the system will dump from the highest module which is ready. If no module is ready, the system does not cause any dumping to occur.

When a module is not ready to dump, the original dumping sequence will be modified. A new sequence is automatically generated, and the order of this sequence is different from the previous sequence, and is determined by which module was not ready and which module actually dumped. This new sequence will be maintained as the preferred dumping sequence until another module is not ready on its specified turn.

Note that, in this embodiment, because $INCR_I$ signals are not necessarily transmitted upwards through the series, on each module's turn, different modules will be on different turns of the cycle. However, the program guarantees that one, and only one, module dumps on a given turn. The system is programmed such that an $INCR_I$ signal cannot start the next operating cycle until $READY_4$ is "on", and the latter cannot happen until there is at least one COUNTER READY signal "on". Thus, there must be a counter that dumps on a given turn. Some turns might take much longer than other turns.

In the embodiment of FIGS. 7 and 8, there is no need for a switch setting to determine whether the module is the last in the series. Instead, since the last module never receives a $READY_I$ signal from a succeeding module (as there is no succeeding module), it never transmits an INCR signal to a succeeding module.

Figure 8A:
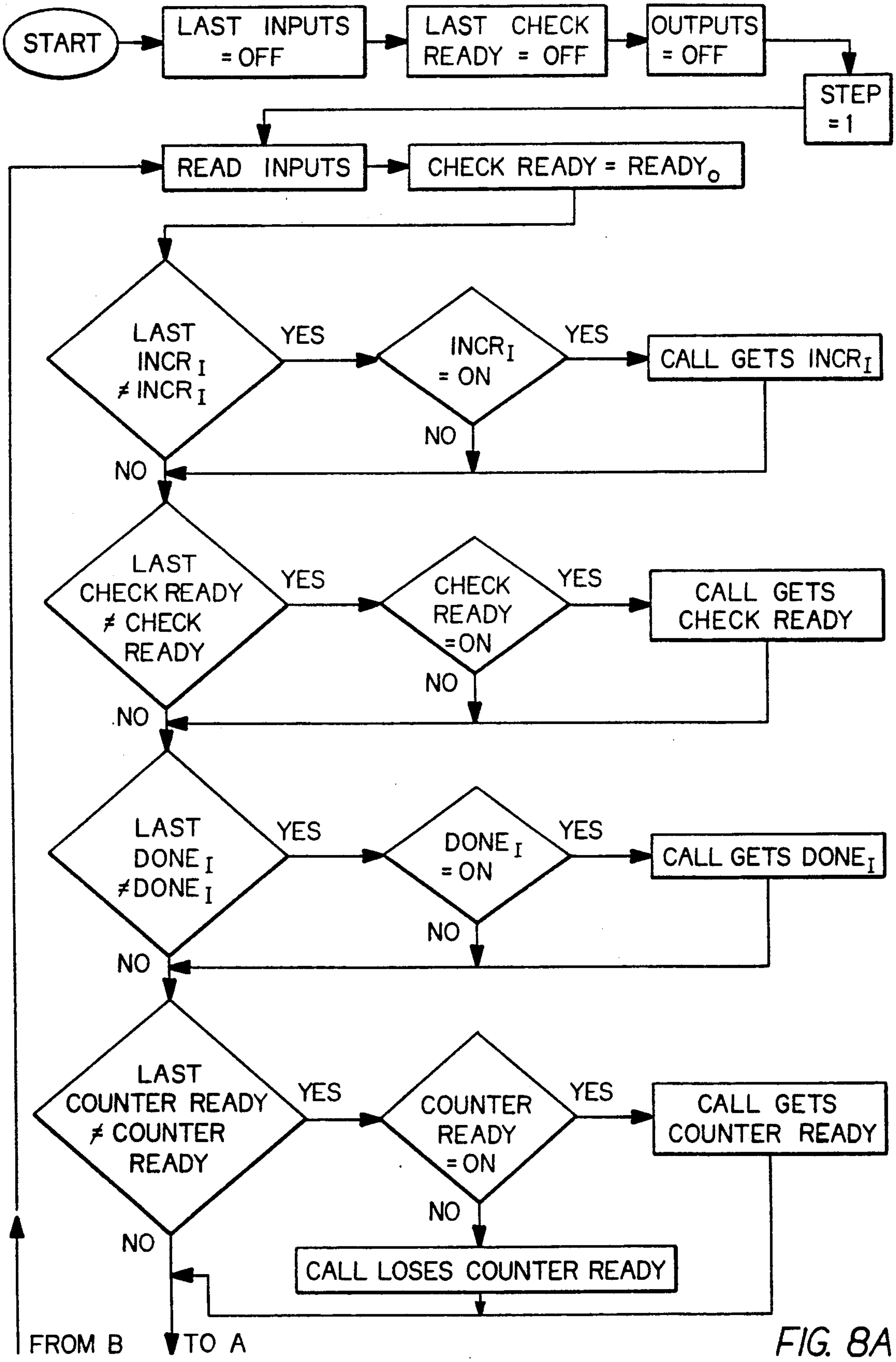
FIGS. 8*a* through 8*e* together comprise a flow chart showing the programming of the modules in the embodiment illustrated in FIG. 7.
Figure 8B:
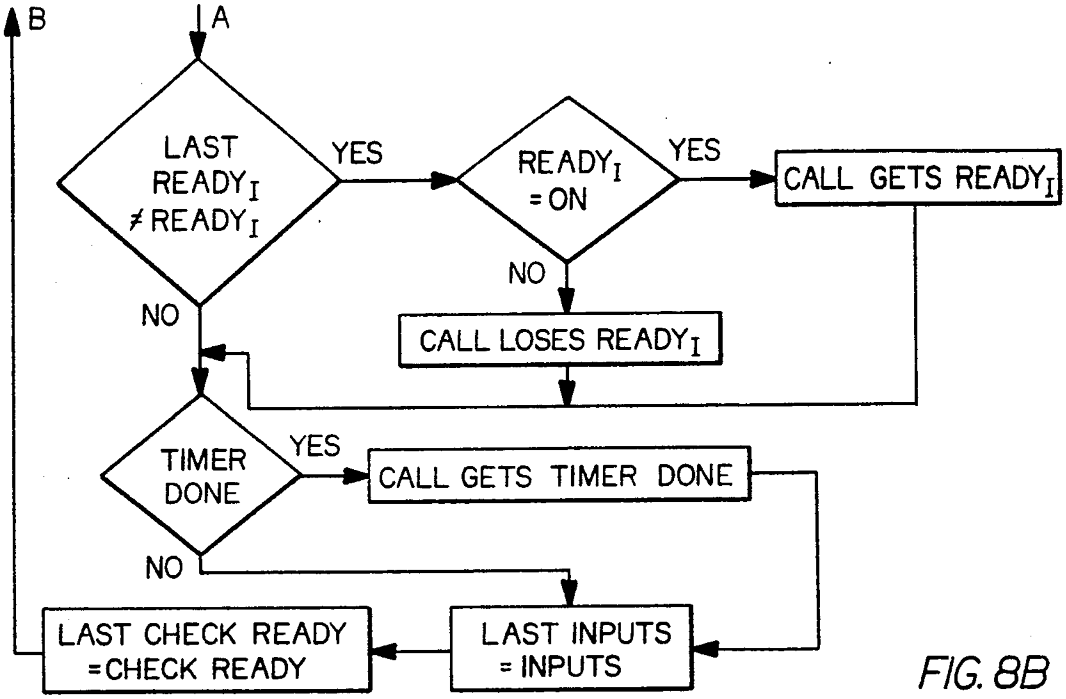
Figure 8C:
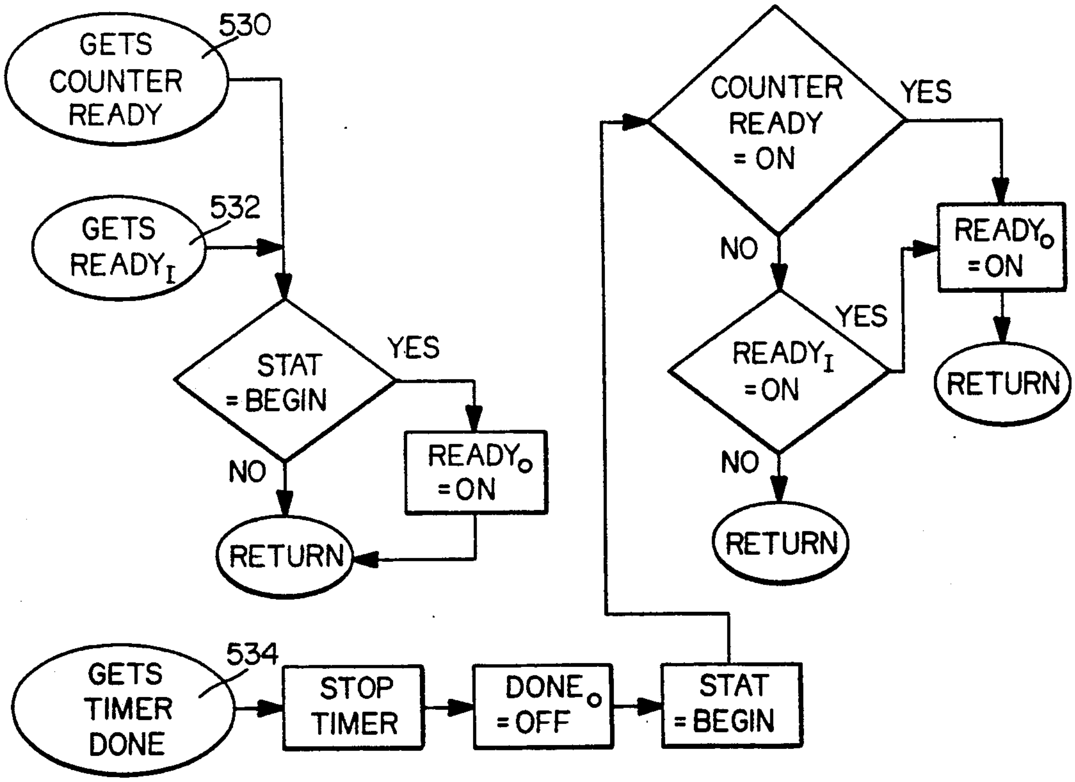
Figure 8D:
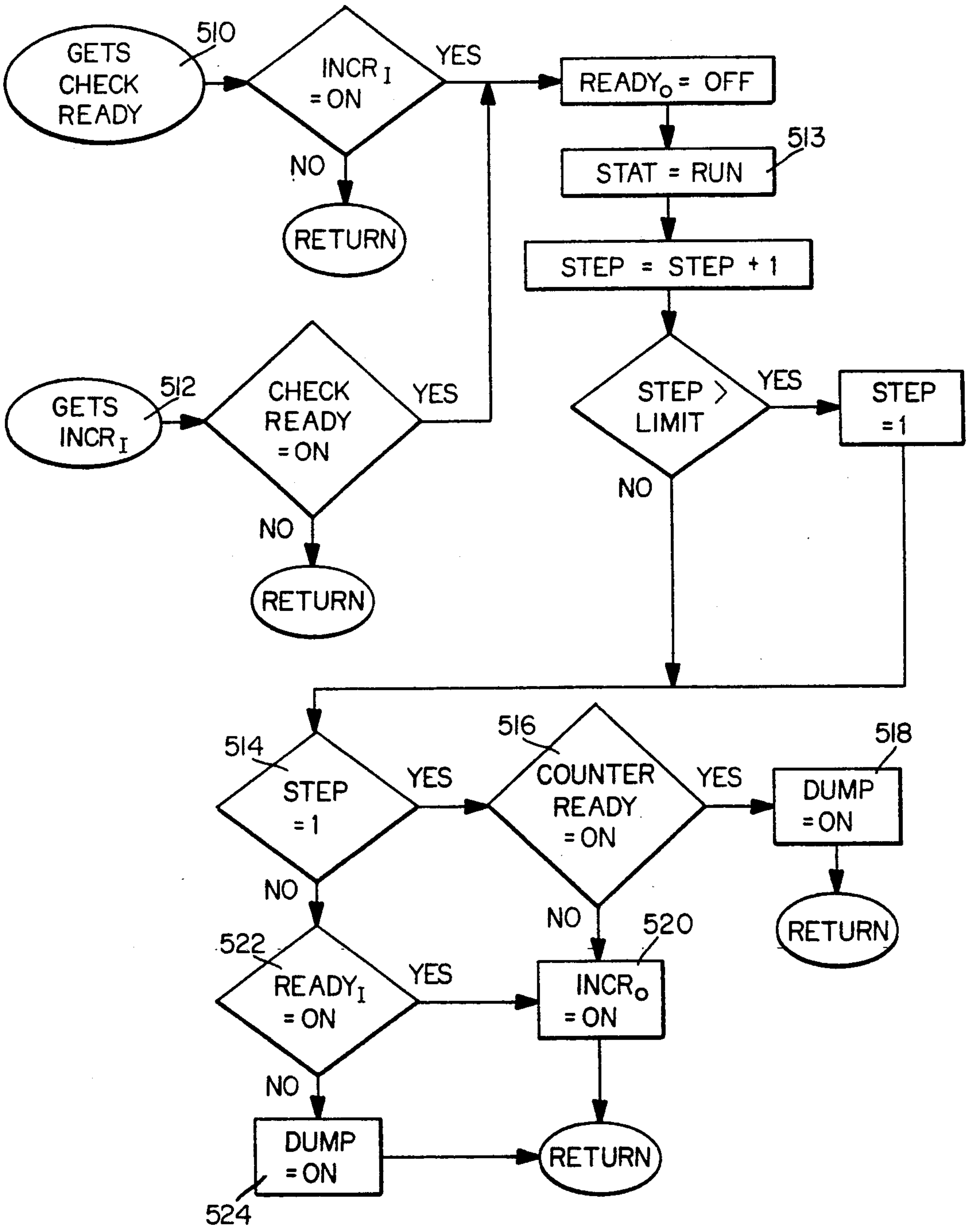
Figure 8E:
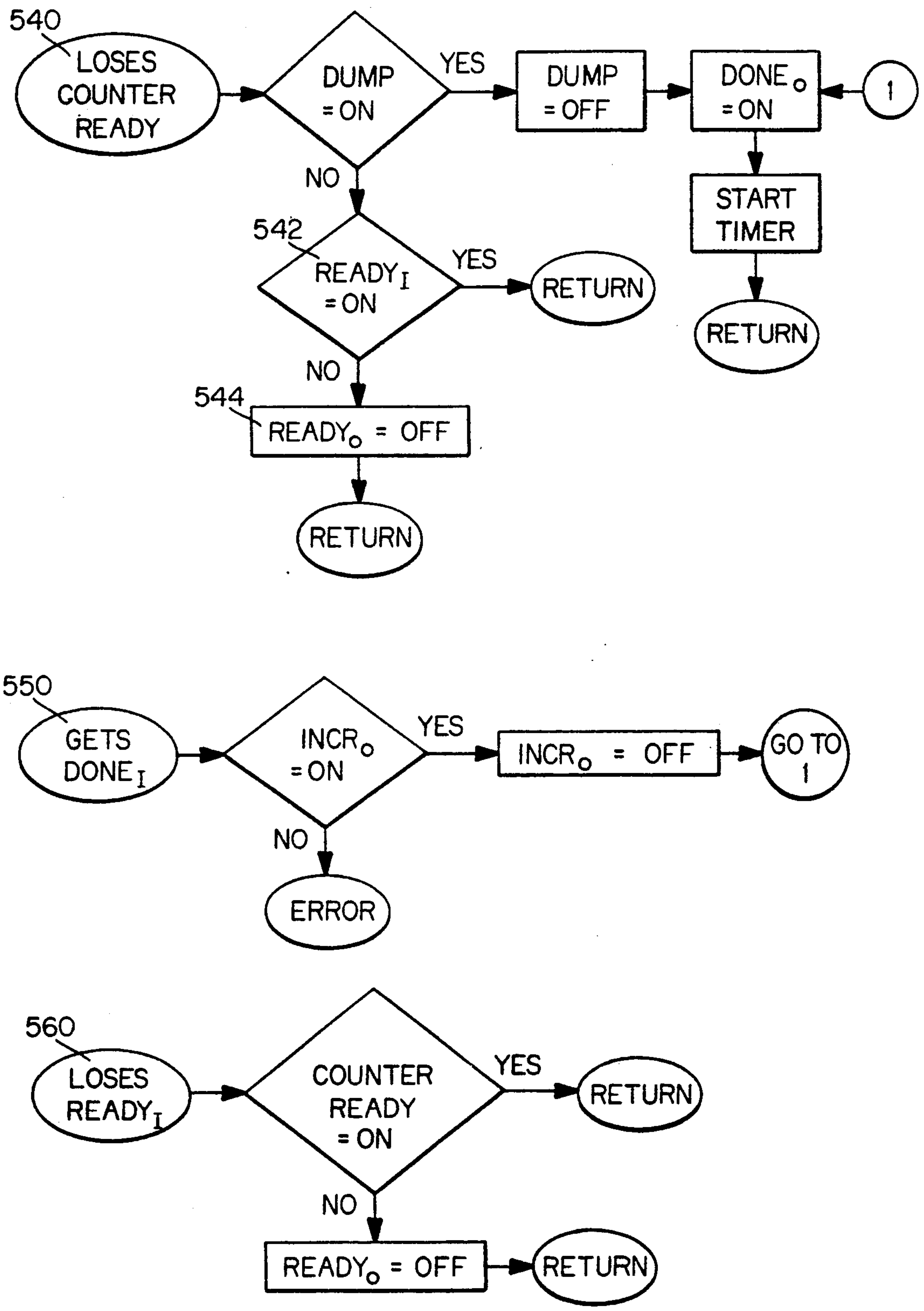

The programming of the modules is illustrated in FIGS. 8*a*, 8*b*, and 8*c*. FIG. 8*a* is essentially identical to FIG. 6*a*, except that there is no call to Subroutine "Loses $DONE_I$". The reason is that, in the other embodiments, where all modules have the same value of STEP, it was important not to begin another operating cycle until all modules were finished. The tests to determine whether $DONE_I$ has changed from "on" to "off" are mainly for the purpose of synchronizing the modules. In the present embodiment, all of the modules need not have the same value of STEP at the same time; one does not care which module dumps, provided that some module dumps on a particular turn. Note also that the order of the loops (e.g. the test for a change in $INCR_I$, the test for a change in CHECKREADY, etc.) has been altered, but this order is of no practical significance, and the loops could be executed in any order.

In this embodiment, STAT has only two possible values, namely "Begin" and "Run".

FIG. 8*b* shows the programming of Subroutine "Gets CHECKREADY" (block 510) and Subroutine "Gets $INCR_I$" (block 512). Except for block 513, which sets STAT to "Run", these subroutines are identical to those shown in FIG. 6*b*, until they reach test 514. In test 514, the program determines whether STEP=1. If so, it is this module's turn to dump. The program then tests COUNTER READY, in test 516. If COUNTER READY is "on", the module causes dumping, by setting DUMP to "on" in block 518. If COUNTER READY is "off", the program turns $INCR_0$ "on", in block 520, which sends an $INCR_I$ signal to the next module. Note that an INCR signal is not necessarily transmitted up the series on each step.

If, in test 514, STEP is not equal to one, then the program tests whether $READY_I$ is "on", in test 522. If so, the module "knows" that there is at least one module, higher up in the series, which is ready to dump. The program therefore continues in block 520, sending an INCR signal to the next module. Eventually that signal will be propagated to the module which is ready to dump.

If STEP is not equal to one, and if $READY_I$ is "off", then the present counter must be ready. The reason is that the program does not reach test 514 unless CHECKREADY is "on", and CHECKREADY is "on" only because $READY_O$ was turned "on". This means that some counter is ready to dump. If $READY_I$ is "off", it means that there is no counter, higher in the series, which is ready to dump. Therefore, unless there is an error in the system, the present module must be ready. The program generates a dump command in block 524. One could insert a provision for error-checking here, by determining whether COUNTER READY is "on".

Subroutines "Gets COUNTER READY" (block 530) and "Gets $READY_I$" (block 532) set $READY_0$ to "on" if the value of STAT is "Begin" and if either COUNTER READY or $READY_I$ have turned "on". Setting $READY_0$ to "on" tells the preceding modules that there is a counter which is ready to dump.

The function of Subroutine "Gets TIMER DONE" (block 534) is apparent from the figures. The program generates a $READY_0$ signal if either COUNTER READY or $READY_I$ is "on". Note that the $READY_0$ signal is turned "off" while the value of STAT is "Run", i.e. while the module is processing a turn. The timer prevents another operating cycle from beginning while the present operating cycle is still in progress.

Subroutine "Loses COUNTER READY" (block 540, FIG. 8*c*) is called when COUNTER READY changes from "on" to "off". If there is no error present, this condition means that the counter has completed its dumping. If DUMP is "on", the program turns DUMP "off", sets $DONE_0$ to "on", and starts the timer. The DONE signal will propagate downward, eventually causing the preceding modules to set their timers and turn off their INCR signals (see Subroutine "Gets $DONE_I$"). This procedure is the beginning of the end of an operating cycle. If DUMP is "off", the program tests $READY_I$, in test 542. If $READY_I$ is "on", there is a module, located above the present module, which is ready to dump. If not, the program sets $READY_0$ to "off", in block 544. The portion of the program containing test 542 and block 544 allows the program to continue to operate even when one counter is not working.

Subroutine "Gets $DONE_I$" (block 550) serves to transmit a DONE signal down the series. As indicated, it turns $INCR_0$ "off", and turns $DONE_0$ "on", and sets the timer. If the program reaches block 550 but $INCR_0$ is not "on", then there is an error, because the DONE signal should not have been generated if the module was not commanded to dump.

Subroutine "Loses $READY_I$" (block 560) serves to turn "off" the READY signal, if the counter of the present module is not ready, and if all counters above it are also not ready ($READY_I$ is "off" ). This subroutine also helps to keep the system operating in the event of a malfunction in one counter. If $READY_I$ is "off", meaning that the succeeding counters are not ready, and if the present counter is not working, setting $READY_0$ to "off" insures that the system will not try to cause the present counter to dump. This feature is useful, because individual counters can often stop working when articles become clogged in the chute, or when discharge gates become stuck, etc.

While the invention has been described with respect to certain specific examples and embodiments, it is understood that many further variations are possible. The invention is not limited by the type of machine which controls the CCU. The programming of the CCU, and/or of the discharge modules, can be varied, within the scope of the invention. These and other variations are intended to be included within the spirit and scope of the following claims.

What is claimed is:

1. Apparatus for automatic discharge of articles, the apparatus including a plurality of discharge modules, each discharge module including a counting device capable of counting a predetermined quantity of articles and discharging said articles upon receipt of a command, each discharge module also including a programmed computer, each computer of each discharge module being programmed substantially identically, each computer being capable of issuing a signal to the counting device to cause discharge of articles, wherein the discharge modules are arranged in series, wherein there is a first discharge module and a last discharge module, wherein electrical signals are passed from the computer in one discharge module to and from the computers in adjacent discharge modules, wherein a signal originating in the first discharge module is passed successively from module to module until the signal reaches the last discharge module in the series, and wherein a signal originating in the last discharge module is passed successively from module to module until it reaches the first discharge module in the series, the apparatus also including a central control unit connected to the first discharge module, the central control unit comprising a computer which is programmed to issue a dump signal to the first of said discharge modules, said dump signal being propagated along the series of discharge modules, the computer of the central control unit also being programmed to receive a "done" signal from the first of said modules, said "done" signal having been propagated along the series from the last discharge module to the first discharge module, the central control unit being connected to an external machine which determines when the apparatus will cause the counters to dump their articles.

2. The apparatus of claim 1, wherein each computer in each discharge module is programmed to record a "turn" upon receipt of a signal from the computer of an adjacent discharge module, and wherein each computer is programmed to cause dumping of articles when a predetermined "turn" is reached.

3. The apparatus of claim 1, wherein the central control unit is also the first discharge module, and wherein the computer of the central control unit is programmed to perform the functions of both the central control unit and of the first discharge module.

4. The apparatus of claim 2, wherein the discharge modules and central control unit are programmed such that no dumping of articles occurs, on a given turn, until all of the discharge modules in the series are ready.

5. The apparatus of claim 2, wherein the discharge modules and central control unit are programmed such that a given discharge module can dump articles, on its turn to dump, as soon as that module is ready to dump.

6. Apparatus for automatic discharge of articles, the apparatus including a plurality of modules, each module including a counting device capable of counting a predetermined quantity of articles and discharging said articles upon receipt of a command, each module also including a programmed computer, each computer of each module being programmed substantially identically, each computer being capable of issuing a signal to the counting device to cause discharge of articles, wherein the modules are arranged in series, wherein there is a first module and a last module, wherein electrical signals are passed from the computer in one module to and from the computers in adjacent modules, wherein a signal originating in the first module is passed successively from module to module until the signal reaches the last module in the series, and wherein a signal originating in the last module is passed successively from module to module until it reaches the first module in the series.

7. The apparatus of claim 6, wherein each computer is programmed to record a "turn" upon receipt of a signal from the computer of an adjacent module, and wherein each computer is programmed to cause discharge of articles when a predetermined "turn" is reached.

8. The apparatus of claim 7, wherein the modules are programmed such that no articles are discharged, on a given turn, until all of the modules in the series are ready.

9. The apparatus of claim 7, wherein the modules are programmed such that a given module can discharge articles, on its turn, as soon as that module is ready.

10. The apparatus of claim 6, further comprising a central control unit, the central control unit being connected to the first of said modules, the central control unit comprising a computer which is programmed to issue a dump signal to the first of said modules, said dump signal being propagated along the series of modules, the computer of the central control unit also being programmed to receive a "complete" signal from the first of said modules, said "complete" signal having been propagated along the series from the last module to the first module.

11. The apparatus of claim 10, wherein the central control unit is adapted to receive an input signal from an external machine.

12. The apparatus of claim 11, wherein the central control unit is adapted to transmit at least one output signal to an external machine.

13. Apparatus for automatic discharge of articles, the apparatus comprising a plurality of substantially identical discharge modules arranged in a series, each module including means for discharging articles accumulated in a hopper and programmable means for determining whether or not the hopper is filled, and for discharging the contents of the hopper upon receipt of a signal, wherein the programmable means includes means for transmitting said signal to another of said programmable means in an adjacent module, wherein the programmable means in all of the modules are identically programmed, the programmable means comprising means for causing articles to be discharged from predetermined modules at predetermined times in response to signals transmitted from module to module.

14. Apparatus for automatic discharge of articles, the apparatus comprising a plurality of substantially identical discharge modules, each module including means for discharging article accumulated in a hopper and means for determining whether or not the hopper is filled, and for discharging the contents of the hopper upon receipt of a signal, each module including a programmed computer means, wherein the computer means in all of the modules are identically programmed, wherein the computer means comprises means for permitting only one module to dump articles at one time, and wherein the computer means also comprises means for permitting each module otherwise to dump articles as soon as its hopper has accumulated a desired number of articles independently of any signal from any source external to said module.

15. A method of discharging articles, comprising the step of:

a) arranging a plurality of substantially identical discharge modules in a series, each module including means for discharging articles accumulated in a hopper and means for determining whether or not the hopper is filled, and for discharging the contents of the hopper upon receipt of a signal,
b) transmitting discrete signals from module to module, upwards through the series, and
c) causing predetermined modules in the series to dump their accumulated articles upon receipt of predetermined numbers of said signals.

16. The method of claim 10, wherein more than one module is permitted to dump articles simultaneously.

17. The method of claim 15, wherein only one module is permitted to dump articles at one time.

18. The method of claim 15, wherein each signal transmitted in step (b) is transmitted only when all modules are ready to receive signals.

19. The method of claim 15, further comprising the step of determining whether all of the discharge modules in the series are ready, and preventing any dumping from occurring until all such modules are ready.

20. The method of claim 15, wherein the modules are permitted to dump their articles as soon as they are ready, and when the predetermined number of signals has been received.

21. The method of claim 15, wherein the signals in step (b) are originated by an external machine.

22. Apparatus for automatic discharge of articles, the apparatus comprising a plurality of substantially identical discharge modules, each module including means for discharging articles accumulated in a hopper and means for determining whether or not the hopper is filled, and for discharging the contents of the hopper upon receipt of a signal, each module including a programmed computer means, wherein the computer means in all of the modules are identically programmed, wherein the computer means are programmed such that the modules tend to dump according to a predetermined sequence, wherein only one module dumps articles at one time, and wherein the modules are programmed to modify the predetermined sequence when the module which should dump accordance to the predetermined sequence is not ready, wherein another module, which is ready to dump, is substituted for the module which is not ready, and wherein the modified sequence becomes the new predetermined sequence until the sequence is modified again, and wherein the sequence can be repeatedly modified in the above manner.

23. A method of discharging articles, comprising the steps of:

a) arranging a plurality of substantially identical discharge modules in a series, each module including means for discharging articles accumulated in a hopper and programmable means for determining whether or not the hopper is filled, and for discharging the contents of the hopper upon receipt of a signal.
b) transmitting discrete signals from module to module, upwards through the series, said signals being programmed to instruct the modules to dump their articles according to a predetermined sequence, and c) modifying the predetermined sequence, so as to substitute, in the sequence, a module which is ready to dump for one which is not ready to dump, wherein a module which is ready to dump is allowed to dump before a module which should dump according to the sequence but which is not ready to dump, and wherein the modified sequence becomes the new predetermined sequence until the sequence is modified again, and wherein the sequence is modified in the above manner whenever a module which should dump, according to the sequence, is not ready to dump, wherein only one module cam dump articles at one time.

* * * * *